(12) United States Patent
Golinowski et al.

(10) Patent No.: US 12,735,948 B2
(45) Date of Patent: Sep. 15, 2026

(54) METHOD AND SYSTEM FOR CONTROLLING A MULTI-STAGE WIRELINE OPERATION IN A WELL

(71) Applicant: TIER 1 ENERGY SOLUTIONS, INC., Edmonton (CA)

(72) Inventors: Jeffrey Golinowski, Sherwood Park (CA); Marcin Jerzy Mizianty, Edmonton (CA); David John O'Connell, St. Albert (CA); Lucas Santos Queiroz, Calgary (CA)

( * ) Notice: Subject to any disclaimer, the term of this patent is extended or adjusted under 35 U.S.C. 154(b) by 12 days.

(21) Appl. No.: 18/813,674

(22) Filed: Aug. 23, 2024

(65) Prior Publication Data

US 2025/0075570 A1 Mar. 6, 2025

Related U.S. Application Data

(60) Provisional application No. 63/579,220, filed on Aug. 28, 2023.

(51) Int. Cl.

| | |
|---|---|
| ***E21B 19/00*** | (2006.01) |
| ***E21B 47/022*** | (2012.01) |
| ***E21B 47/04*** | (2012.01) |
| ***G05B 13/02*** | (2006.01) |

(52) U.S. Cl.

CPC .......... *E21B 19/008* (2013.01); *E21B 47/022* (2013.01); *E21B 47/04* (2013.01); *G05B 13/028* (2013.01); *E21B 2200/20* (2020.05)

(58) Field of Classification Search

CPC . E21B 19/008; E21B 2200/00; E21B 2200/22

See application file for complete search history.

(56) References Cited

U.S. PATENT DOCUMENTS

| | | | | |
|---|---|---|---|---|
| 2013/0138254 | A1* | 5/2013 | Seals | E21B 7/068 175/2 |
| 2023/0228897 | A1* | 7/2023 | Thompson | G01V 1/42 |
| 2024/0051802 | A1* | 2/2024 | Abuhaikal | E21B 19/084 |

* cited by examiner

*Primary Examiner* — Giovanna Wright

(74) *Attorney, Agent, or Firm* — Bennett Jones LLP

(57) ABSTRACT

Embodiments herein generally relate to a method and system for controlling a multi-stage wireline operation in a well, such as during a plug-and-perf operation. The method can comprise: applying a trained initial stage machine learning model to generate predictions for optimized wireline parameters, for a first stage of the wireline operation; operating a wireline control system, to complete the first stage, in accordance with the optimized wireline parameters; applying a trained later stages machine learning model to generate predictions for optimized wireline parameters for each subsequent stage of the wireline operation; and operating the wireline control system, to complete each subsequent stage, in accordance with the optimized wireline parameters generated for that stage by the trained later stages model.

20 Claims, 19 Drawing Sheets

508
510

508
510

Replay of Stage 11 POOH.csv.json

Speed Tension 300 250 200 150 100 50 0 -50

Speed

Measured Depth

METHOD AND SYSTEM FOR CONTROLLING A MULTI-STAGE WIRELINE OPERATION IN A WELL

CROSS-REFERENCE TO RELATED APPLICATION(S)

The present application claims the benefit and priority of U.S. Provisional Patent Application Ser. No. 63/579,220, titled "METHOD AND SYSTEM FOR CONTROLLING A MULTI-STAGE WIRELINE OPERATION IN A WELL", filed on Aug. 28, 2023, the entire contents of which are incorporated herein by reference.

FIELD

The present invention generally relates to wireline operations for oil and gas applications, and more particularly, to a method and system for controlling a multi-stage wireline operation in a well, such as during a plug-and-perf operation.

BACKGROUND

Wireline operations involve lowering wirelines (e.g., cables) into oil and gas wells via wireline cabling systems, e.g., mounted onto wireline trucks or skids. The wireline can be used to lower equipment into the well, as well as retrieve equipment and other devices from inside of the well.

In oilfield exploration, wireline operations have a number of important uses. These include wireline logging for collecting data about subsurface formations. More pertinently, wireline operations are used for plug-and-perf operations to facilitate hydrocarbon (e.g., oil) recovery.

SUMMARY OF VARIOUS EMBODIMENTS

In accordance with one broad example, there is provided a method for controlling a multi-stage wireline operation in a well, comprising: applying a trained initial stage machine learning model to generate predictions for optimized wireline parameters, for a first stage of a wireline operation; operating a wireline control subsystem to control the speed of a wireline with a bottomhole assembly inside a well, to complete the first stage, in accordance with the optimized wireline parameters for the first stage; applying a trained later stages machine learning model to generate predictions for optimized wireline parameters for each subsequent stage of the wireline operation; and operating the wireline control subsystem to control the speed of the wireline with the bottomhole assembly inside the well, to complete each subsequent stage, in accordance with the optimized wireline parameters generated for that stage by the trained later stages model.

In some examples, the optimized wireline parameters comprise one or more of an optimized speed range and an optimized tension range, across a measured depth of the well, for a run in hole (RIH) and pull out of hole (POOH).

In some examples, the input into the trained initial stage model comprises structural data relating to the well, and the structural data comprises one or more of an azimuth, inclination and measured depth of the well.

In some examples, the method further comprising, initially, training the initial stage model by: analyzing structural data, for one or more historical wells, to generate one or more first training features; analyzing wireline operation data, for the one or more historical wells, to generate one or more second training features; generating an input feature set comprising the one or more first and second training features, for each of the historical wells; and training the initial stage model based on the input feature set.

In some examples, the one or more first training features comprise: (i) cosine and sine of azimuth; (ii) distance to and from kickoff; (iii) shifted inclination values; (iv) mean values of inclination and azimuth); and (v) measured depth.

In some examples, the method further comprising, during the operating of the wireline control subsystem in the first stage monitoring operation of the wireline to generate measured wireline data.

In some examples, the measured wireline data comprises measured speed and tension values at different depth intervals, for a run in hole (RIH) and pull out of hole (POOH) process.

In some examples, after the first stage is completed, and prior to each subsequent stage, the method further comprises training the later stages model, the training comprising: generating one or more training features based on the wireline operation data generated from the previous stage; and training the later stages model using the one or more training features.

In some examples, wherein the wireline operation data comprises one or more data entries, each data entry comprising: (i) measured tension and speed readings at a given depth; and (ii) suggested optimized tension and speed readings at that depth.

In some examples, wherein operating the wireline control system results from one of user input into a user input interface coupled to the at least one processor, or automatic control by the at least one processor.

In another broad aspect, there is provided a system for controlling multi-stage wireline operation in a well, the system comprising: a wireline control subsystem coupled to a wireline with a downhole assembly; and at least one processor configured for: applying a trained initial stage machine learning model to generate predictions for optimized wireline parameters, for a first stage of a wireline operation; operating the wireline control subsystem to control the speed of the wireline and bottomhole assembly inside a well, to complete the first stage, in accordance with the optimized wireline parameters for the first stage; applying a trained later stages machine learning model to generate predictions for optimized wireline parameters for each subsequent stage of the wireline operation; and operating the wireline control system to control the speed of the wireline and the bottomhole assembly inside the well, to complete each subsequent stage, in accordance with the optimized wireline parameters generated for that stage by the trained later stages model.

In some examples, the optimized wireline parameters comprise one or more of an optimized speed range and an optimized tension range, across a measured depth of the well, for a run in hole (RIH) and pull out of hole (POOH).

In some examples, the input into the trained initial stage model comprises structural data relating to the well, and the structural data comprises one or more of an azimuth, inclination and measured depth of the well.

In some examples, the at least one processor is further configured for initially, training the initial stage model by: analyzing structural data, for one or more historical wells, to generate one or more first training features; analyzing wireline operation data, for the one or more historical wells, to generate one or more second training features; generating an input feature set comprising the one or more first and second training features, for each of the historical wells; and training the initial stage model based on the input feature set.

In some examples, one or more first training features comprise: (i) cosine and sine of azimuth; (ii) distance to and from kickoff; (iii) shifted inclination values; (iv) mean values of inclination and azimuth); and (v) measured depth.

In some examples, system further comprising, during the operating of the wireline control system in the first stage: monitoring operation of the wireline to generate measured wireline data.

In some examples, the measured wireline data comprises measured speed and tension values at different depth intervals, for a run in hole (RIH) and pull out of hole (POOH) process.

In some examples, after the first stage is completed, and prior to each subsequent stage, the method further comprises training the later stages model, the training comprising: generating one or more training features based on the wireline operation data generated from the previous stage; and training the later stages model using the one or more training features.

In some examples, the wireline operation data comprises one or more data entries, each data entry comprising: (i) measured tension and speed readings at a given depth; and (ii) suggested optimized tension and speed readings at that depth.

In some examples, operating the wireline control system results from one of user input into a user input interface coupled to the at least one processor, or automatic control by the at least one processor.

Other features and advantages of the present application will become apparent from the following detailed description taken together with the accompanying drawings. It should be understood, however, that the detailed description and the specific examples, while indicating preferred embodiments of the application, are given by way of illustration only, since various changes and modifications within the spirit and scope of the application will become apparent to those skilled in the art from this detailed description.

BRIEF DESCRIPTION OF THE DRAWINGS

For a better understanding of the various embodiments described herein, and to show more clearly how these various embodiments may be carried into effect, reference will be made, by way of example, to the accompanying drawings which show at least one example embodiment, and which are now described. The drawings are not intended to limit the scope of the teachings described herein.

FIG. 7A is a plot of an example predicted optimized speed profile, generated by a trained later stages model.

Further aspects and features of the example embodiments described herein will appear from the following description taken together with the accompanying drawings.

DETAILED DESCRIPTION OF THE EMBODIMENTS

Embodiments herein generally relate to methods and systems for controlling multi-stage wireline operations, such as during plug-and-perf operations. The disclosed methods and systems may use one or more trained machine learning models.

I. GENERAL OVERVIEW

Figure 1:
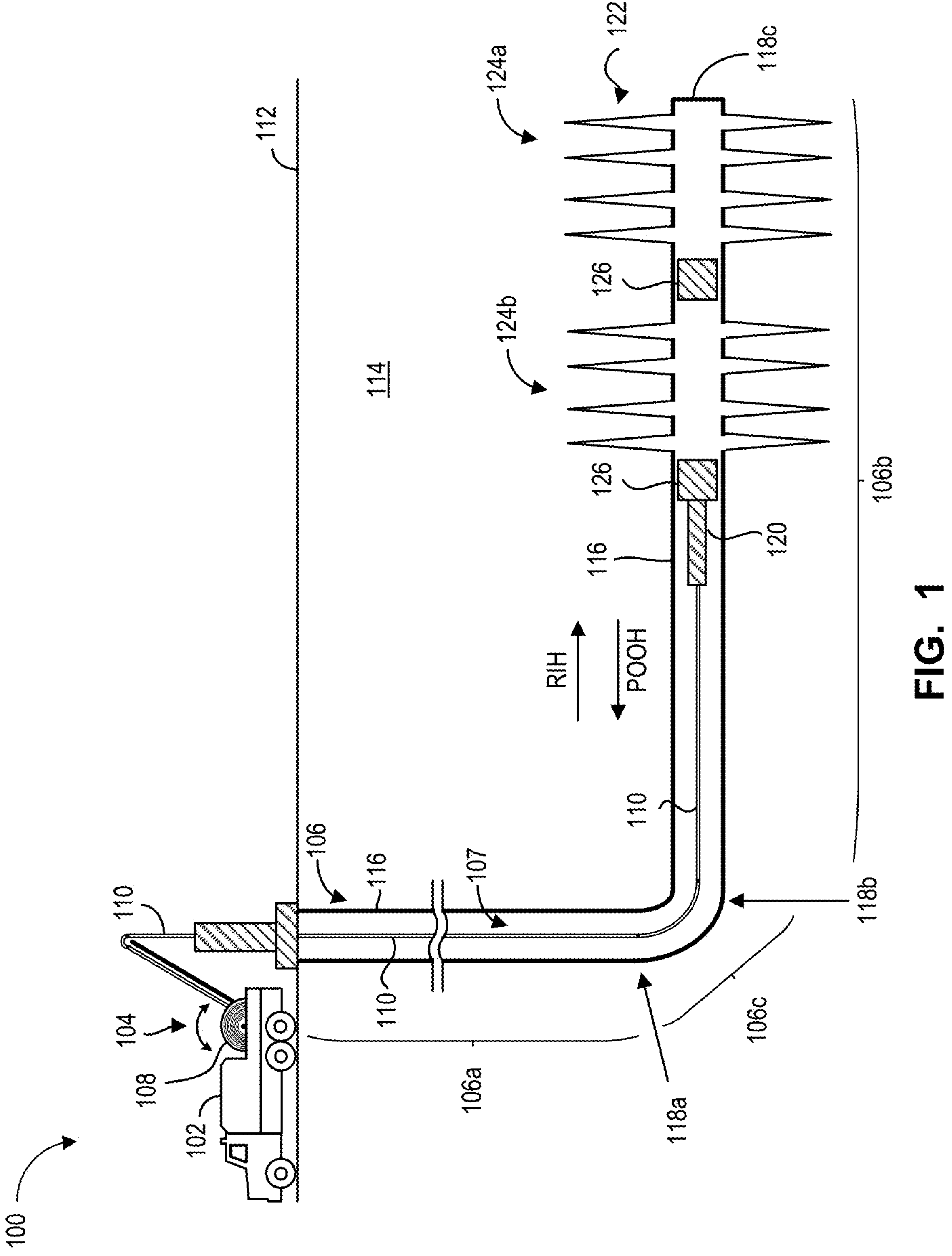
FIG. 1 illustrates an example plug-and-perf operation.

FIG. 1 illustrates an example environment (100) for applying the disclosed systems and methods. In environment (100), a wireline operation is performed to complete a plug-and-perf operation, e.g., for oil or gas recovery.

As shown, a wireline truck (102) is provided for transporting a wireline cabling system (104). The wireline cabling system (104) can be used for a plug-and-perf operation. In the illustrated example, the wireline cabling system (104) includes a wireline drum (108), among other components. Wireline drum (108) is controlled to release or retract wireline (110) into or out of well (106), e.g., by rotating clockwise or counter clockwise. Wireline (110) can include any suitable cable, wire or other conductor.

As illustrated, well (106) extends below ground (112), into a subsurface formation (114). Well (106) includes a well hole (107) surrounded by a casing (116).

As known in the art, well (106) can include a generally vertical portion (**106*a*) and a generally horizontal portion (106*b*). The two portions are linked together by a bend portion (106_c_). Bend (106_c_) extends between a kickoff point (118_a_) and a lateral heel point (118**_b_).

Vertical portion (106_a_) extends between the ground (112) and the kickoff point (118_a_), while horizontal portion (106_b_) extends between the lateral heel point (118_b_) and a lateral toe (118_c_).

To perform a plug-and-perf operation, a bottom hole assembly (BHA) (120) is coupled to a distal end of the wireline (110). The BHA (120) includes various components, including perforating guns, fracturing plugs (frac plugs), and setting tools for setting the frac plugs, as known in the art.

A plug-and-perf operation is typically performed over multiple "stages". In the first stage, the BHA (120) is equipped with perforating guns. Fluid is injected, from above surface, to pump the wireline (110) and BHA (120) proximal the lateral toe (118_c_). This process is known as a "run in hole" (RIH).

Once the BHA (120) is situated relatively proximal to the toe (118_c_), an electric signal is transmitted through the wireline (110). The electrical signal activates the perforating gun, which blasts holes through the well casing (116).

Once the blasting is complete, the wireline (110) is retracted outside of the well (106) in a process known as "pull out of hole" (POOH). Fracture fluid (frac fluid) is then pumped, from above surface, into well (106). The frac fluid surges through the perforations caused in the well casing (116), to generate fractures (122) inside formation (114). This completes the first stage (124_a_) of the plug-and-perf.

In the second stage (124_b_), the wireline (110)/BHA (120) are again inserted into the well (106), in another run in hole (RIH) process. This time the BHA (120) includes a frac plug (126). The RIH is performed again by pumping fluid to carry the wireline (110)/BHA (120) through the well (106). The frac plug (126) is deployed using the setting tool and fluidically isolates the first stage (124_a_) from the second stage (124_b_). Once the plug is deployed, the perforating guns are activated again to generate new blasts in casing (116). The wireline is then retracted outside of the well (106), via a pull out of hole (POOH) process. Frac fluid is once again pumped to generate new fractures (122).

The above process is iterated for a plurality of stages, wherein each stage involves a run in hole (RIH), followed by a pull out of hole (POOH) and each stage is separated by a frac plug (126). Once all stages are complete, the plugs are milled out, thereby completing the plug-and-perf operation. At this point, oil or gas can be recovered via the hydraulic fractures (122).

To that effect, a significant challenge faced in multi-stage wireline operations (e.g., plug-and-perf operations) is optimizing wireline speed, during the RIH and POOH processes. In other words, maximizing the speed at which the wireline is inserted, and then retracted, from the well (106) at each stage. The ability to optimize wireline speed allows reducing the total time required to complete the operation.

Optimizing wireline speed is often constrained by the tension applied to the wireline. If the wireline is operated at too high speeds during either RIH or POOH, the wireline experiences excessive tension forces. High tension forces, in turn, apply high mechanical stress on the wireline, which may break the wireline, or at least decrease its useful lifespan. In either case, the wireline requires eventual replacement at increased cost.

Balancing (i) wireline speed and (ii) tension constraints, requires accounting for a multiplicity of complex factors. For example, the tension properties of a wireline can vary based on: (a) the weight of the bottom hole assembly (BHA) (120) coupled to the wireline (110), as well as, (b) the rate and volume of above-surface fluid being pumped to carry the wireline (110)/BHA (120) into the well (106) during an RIH.

Tension properties on the wireline also vary depending on whether the wireline is run in hole (RIH), or pulled out of hole (POOH).

For example, as noted previously, during RIH the wireline (110)/BHA (120) are carried into the well (106) by pumping fluid. Therefore, releasing the wireline (110) from the drum (108) at higher speeds results in reducing the tension on the wireline. This is because, by releasing the wireline at higher speeds, the pumped fluid carries the wireline (110) down the well (106) more easily. In contrast, releasing the wireline (110) at slower speeds results in friction between the pumped fluid and the wireline (110), thereby increasing the tension on the wireline (110). Additionally, releasing wireline (110) at too high speeds can also cause a loss of control, as the wireline may overshoot its target placement for the next stage of the plug-and-perf.

As contrasted to RIH, during POOH, the wireline (110)/BHA (120) is not moving in the same direction as the pumped fluid, but must move opposite and displace pumped fluid inside the well (106) to retract outwardly. Accordingly, retracting the wireline (110) at higher speeds has the opposite effect of increasing tension. This is because at higher speeds, the wireline (110)/BHA (120) experience increased fluid friction.

Still further, tension properties on the wireline (110) are also affected by the portion of the well (106) in which the wireline is travelling through. For example, during an RIH or POOH, the wireline (110) is subject to different tension forces as it travels through each of the vertical well portion (106_a_), horizontal well portion (106_b_) and bend portion (106_c_).

In view of the foregoing, it is typically impractical for a human operator to effectively control the wireline system (104), with a view to optimizing wireline speeds, while accounting for the numerous factors dynamically affecting wireline tension.

As provided herein, disclosed examples use trained machine learning models which predict the optimal speed, or range of speeds, for a wireline during different stages of a wireline operation. The trained machine learning models are trained to identify relationships between wireline tension and speed at different points in the wireline operation. By optimizing wireline speed, the time required to complete a wireline operation (e.g., a plug-and-perf operation) is reduced, all the while improving overall performance of the wireline and extending its lifetime by minimizing the applied tension.

II. EXAMPLE SYSTEM FOR CONTROLLING MULTI-STAGE WIRELINE OPERATION

Figure 2:
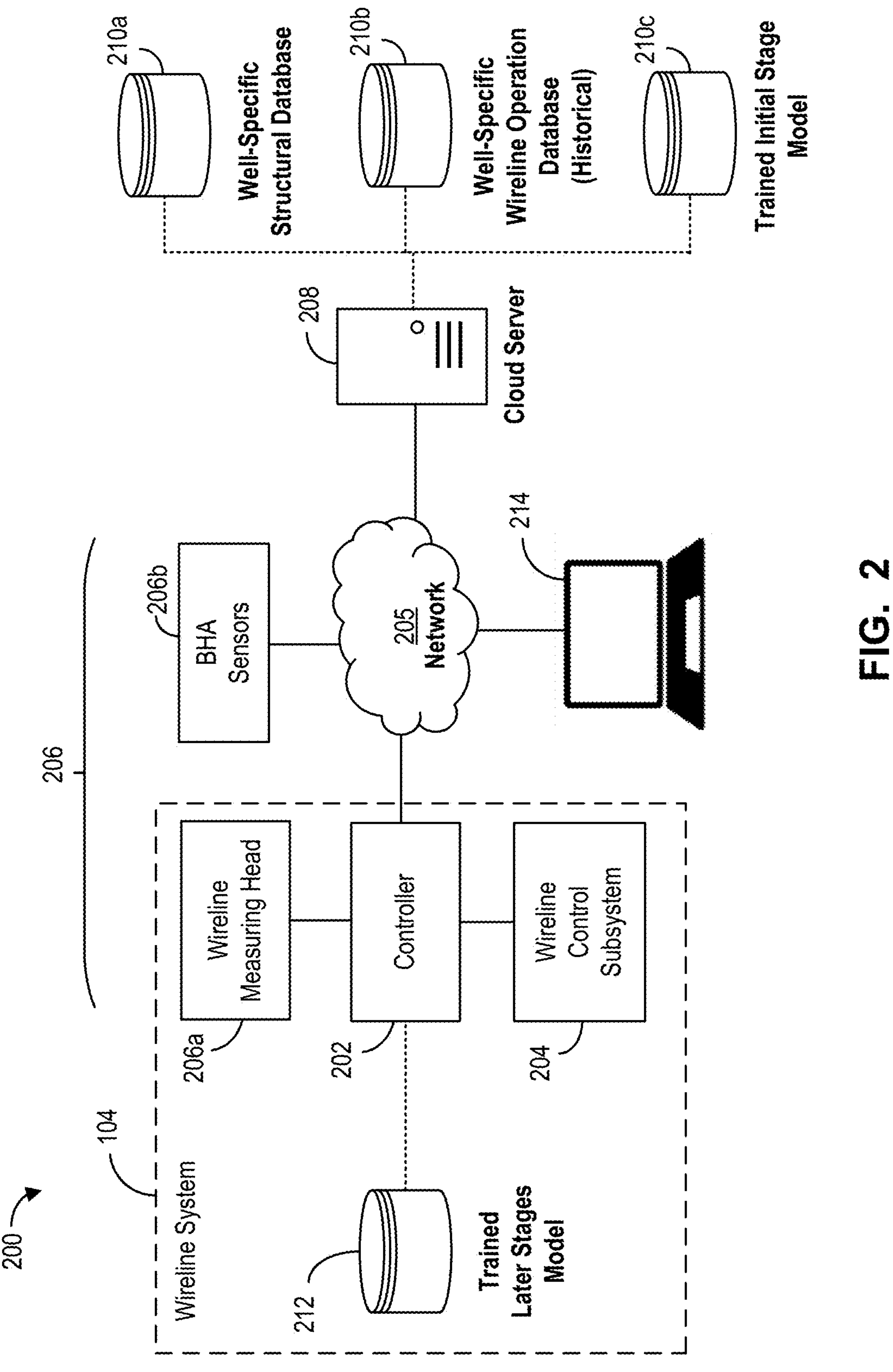
FIG. 2 is a simplified block diagram of an example system for controlling a multi-stage wireline operation.

FIG. 2 shows a simplified block diagram of an example system (200) for controlling a multi-stage wireline operation.

As shown, system (200) includes the wireline system (104), which is coupled over network (205), to one or more of a server (208) and a user device (214).

Wireline system (104), itself, includes a controller (202), coupled—directly or indirectly—to one or more of a wireline control subsystem (204) and a wireline measuring head (206_a_).

In some examples, controller (202) is a user device (e.g., a computer, tablet or the like) which includes a display and/or input interface. An operator, of the wireline system (e.g., wireline truck (102)), may interact with the controller (202) to control various aspects of the system (104).

In other examples, controller (202) may not necessarily require human input, and may otherwise provide for automated control of system (104). More generally, controller (202) can provide for any one or more of: manual control, partial manual/automated control, and full automated control, of system (200).

Wireline control subsystem (204) includes various components for controlling movement of the wireline (110). For example, subsystem (204) can include a motor coupled to the drum (108) (e.g., the shaft of the motor may be coupled to the drum (108)), and for controlling rotation direction and speed of the wireline drum (108) (FIG. 1).

In some examples, subsystem (204) is controlled to adjust the rotational direction and speed of the wireline drum (108). For instance, subsystem (204) can control clockwise or counter clockwise rotation of the wireline drum (108). In this manner, the wireline is inserted or retracted from the well (106), during run in hole (RIH) or pulled out of hole (POOH) processes. Additionally, by adjusting the speed of rotation of the wireline drum (104), the speed and/or tension of the wireline (110) are also adjustable.

In examples where controller (202) allows for manual control, the subsystem (204) is controlled based on user inputs, entered into controller (202), e.g., by a human operator. As such, an operator can control the rotational direction and/or speed of the wireline, via controller (202). In other examples, controller (202) may itself fully or partially automate control of the wireline control subsystem (204).

System (200) also includes a sensor subsystem (206). Sensor subsystem (206) includes one or more sensors for monitoring wireline operation, and generating measured wireline data. Measured wireline data includes, for example, data relating to measured depth, speed and tension of the wireline (110). This data can be generated by various types of directional speed and tension sensors. As provided herein, the measured wireline data is analyzed to optimize speed and tension parameters of the wireline operation.

In at least one example, the sensor subsystem (206) includes a wireline measuring head (206*a*). The wireline measuring head (206*a*) can be located on the wireline truck (102). As known in the art, wireline (110)—from wireline drum (108)—is inserted through the measuring head (206*a*) to monitor various wireline properties. Measuring head (206*a*) may include its own sensors, such as linear encoders for monitoring wireline speed, as well as load pins for monitoring applied tension on the wireline.

Sensor subsystem (206) can also include various other sensors for measuring wireline properties. These include rotational sensors coupled to the wireline drum motor, which can also monitor speed and direction of the wireline (110). Examples of rotational sensors include potentiometers, non-contacting rotary sensors (e.g., Hall Effect sensors), and the like.

Still further, sensor subsystem (206) can include sensors associated with the bottom hole assembly (120). More generally, it will be understood that the sensor subsystem (206) broadly includes any sensors included in system (200), irrespective of their installation location.

As shown, sensor data—from sensor subsystem (206)—is received by the controller (202), directly or indirectly. In some examples, controller (202) receives sensor data indirectly, e.g., via network (205). Sensor data can also be transmitted, directly or in-directly, to server (208). The sensor data is received by the controller (202) or server (208) for processing and analysis.

Continuing with reference to FIG. 2, server (208) is a computer server connected to network (205). Server (208) has a processor, volatile and non-volatile memory, at least one network interface, and may have various other input/output devices. As with all devices shown in the system (200), there may be multiple servers (208), although not all are shown.

Server (208) need not be a dedicated physical computer. For example, server (208) can be a "cloud server". In some examples, the various logical components that are shown as being provided on server (208) may be hosted by a third party "cloud" hosting service such as Amazon™ Web Services™ Elastic Compute Cloud (Amazon EC2).

As explained in greater detail herein, server (208) can include a memory for storing various data, including: (i) a well-specific structural database (210*a*); (ii) a historical well-specific wireline operation database (210*b*); and (iii) a trained initial stage machine learning model (210*c*). In other examples, these databases can be stored in any other location in the system, e.g., controller (2020 or user device (214).

Well-specific structural database (210*a*) stores any and all data relating to the physical and structural properties, dimensions and configurations of various wells. By way of non-limiting example, this includes data relating to the: (i) measured depth of a well; (ii) azimuth along different portions and/or segments of the well (also referred to herein as "depth segments"); (iii) inclination along different depth segments of the well; (iv) shifted inclination of the well, also along different depth segments of the well; (v) length of the vertical well portion (106*a*) and horizontal well portion (106*b*) (FIG. 1); and (vi) angle of bend (106*c*) (FIG. 1). To this effect, a "depth segment" can be defined in any suitable manner (e.g., every one (1) meter of measured depth).

In some examples, a well's structural data (210*a*) is obtained through initial surveying and logging techniques, as known in the art. For example, prior to performing a wireline operation on a well, the well's structural data is surveyed or logged and uploaded to the server (208) for archiving.

The well structural data (210*a*), stored on server (208), can include structural data for both: (a) historical wells—e.g., wells previously subject to wireline operations (e.g., plug-and-perf operations); or (b) current or future wells—e.g., wells that are scheduled for wireline operations at a current or future point in time. As provided herein, the well structural data is used for training various machine learning models.

Still continuing with reference to FIG. 2, well-specific historical wireline operation database (210*b*) stores various data relating to previously completed wireline operations for historical wells. As used herein, a "historical well" refers to a well which was previously subject to a wireline operation, such as a plug-and-perf operation.

By way of a non-limiting example, the historical wireline operation data can include: (i) measured wireline data for each historical well—e.g., measured speed and tension of the wireline, as a function of depth, through all stages of the plug-and-perf operation, inclusive of RIH and POOH at each stage. This wireline data may also be timestamped and labelled, as explained below; and (ii) predicted wireline parameters for each historical well—e.g., predicted optimized speed and tension parameters, as a function of depth, generated using trained machine learning models disclosed herein, through all stages of the plug-and-perf operation, inclusive of RIH and POOH at each stage. In other words, the historical data can include both the data predicted by trained models, and the actual results during operation.

In some examples, the historical wireline operation data (210*b*) is received from the wireline system (104) after completing operation on a well. For example, after the wireline operation is complete, the wireline system (104) (e.g., controller (202)) can transmit the wireline operation data to the server (208) for archiving.

In other examples, the historical wireline operation data (210*b*) is transmitted to server (208) in real-time or near-real time, or at pre-defined time or frequency intervals, during a well operation. Some historical wireline operation data can be received directly from sensor subsystem (206).

As detailed herein, the historical wireline operation data is also used to train various machine learning models.

Server (208) may also store an "initial stage" machine learning model (210*c*). When the wireline system (104) is deployed in a new well, the initial stage model (210*c*) generates an initial prediction for optimized wireline speed and tension properties for the first stage of a wireline operation.

In contrast to the "initial stage" model (210*c*), the system may also host a second machine learning model (212): the "later stages" model. Once the first/initial stage is complete, the later stages model optimizes speed and tension predictions, for the wireline operation, for each subsequent stage.

The initial stage model (210*c*) and later stages model (212) may be hosted on controller (202), server (208) or any other suitable computing device.

In FIG. 2, user device (214) can be a computer, laptop, phone or the like. User device (214) can be display or output various well-related data (e.g., well structural data and wireline operation data), as well as various reports for review (e.g., well completion reports, job summary reports, etc.).

Network (205) can include any wired or wireless network, as the case may be.

III. EXAMPLE METHODS FOR CONTROLLING WIRELINE OPERATION

The following is a description of various example methods for controlling wireline operation, in accordance with disclosed embodiments.

(i.) General Method

As indicated previously, with reference to FIG. 1, a plug-and-perf operation is often performed over multiple stages. Each stage involves a run in hole (RIH) of the wireline, followed by a pull out of hole (POOH).

Figure 3A:
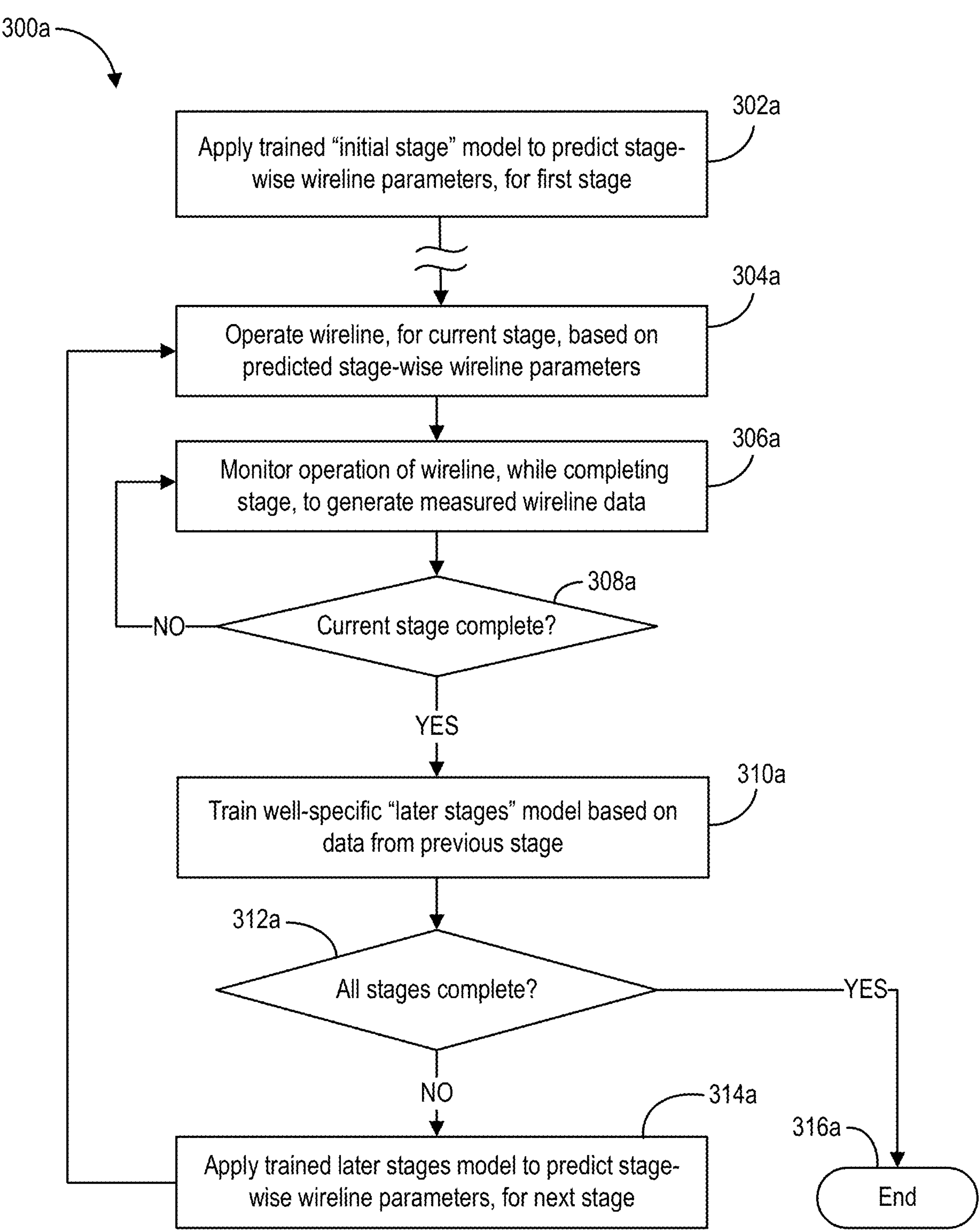
FIG. 3A is a process flow of an example method for controlling a multi-stage wireline operation.

FIG. 3A shows a process flow for an example method (300*a*) for controlling a multi-stage wireline operation, e.g., during plug-and-perf. In some examples, method (300*a*) is executed by at least one processor of one, or a combination, of the controller (202) and server (208) (FIG. 2).

As shown, at (302*a*), a trained "initial stage" machine learning model (210*c*) is applied.

The initial stage model is trained to predict parameters, for controlling the wireline, in the first stage of the wireline operation. The predicted parameters include predictions for optimized speed and tension for the wireline during the first stage, and at various depth intervals or depth segments (e.g., for both RIH and/or POOH).

As used herein, "stage-wise wireline parameters" refers to the set of tension and speed parameters of the wireline, at a given stage of the wireline operation.

More generally, the initial stage model is trained to predict an optimal speed range for operating the wireline, which minimizes excessive tension on the wireline, while also reducing the time required to complete the first stage. The output of the model includes predictions for optimized speed and tension ranges, for both first stage RIH and POOH, across the range of measured depths in the well (or any portion thereof).

To clarify this concept, concurrent reference is made to FIGS. 5A to 5F.

Figure 5A:
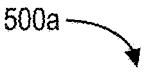
FIG. 5A is a plot showing a predicted optimized tension profile, for an example first stage pull out of hole (POOH) process.
Figure 5A:
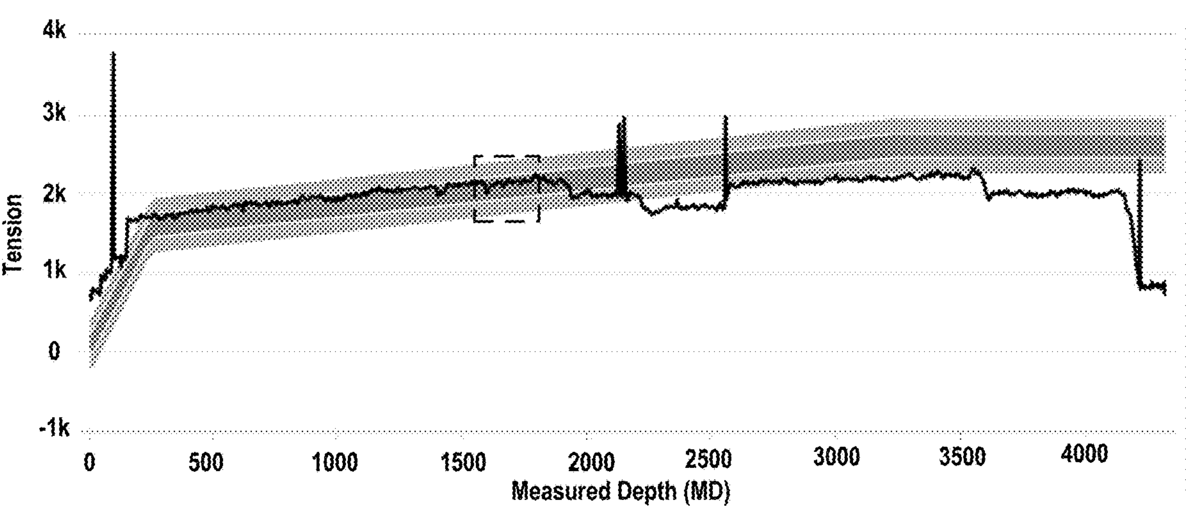
Figure 5B:
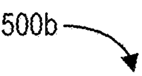
FIG. 5B is a plot showing a predicted optimized speed profile, for an example first stage pull out of hole (POOH) process.
Figure 5B:
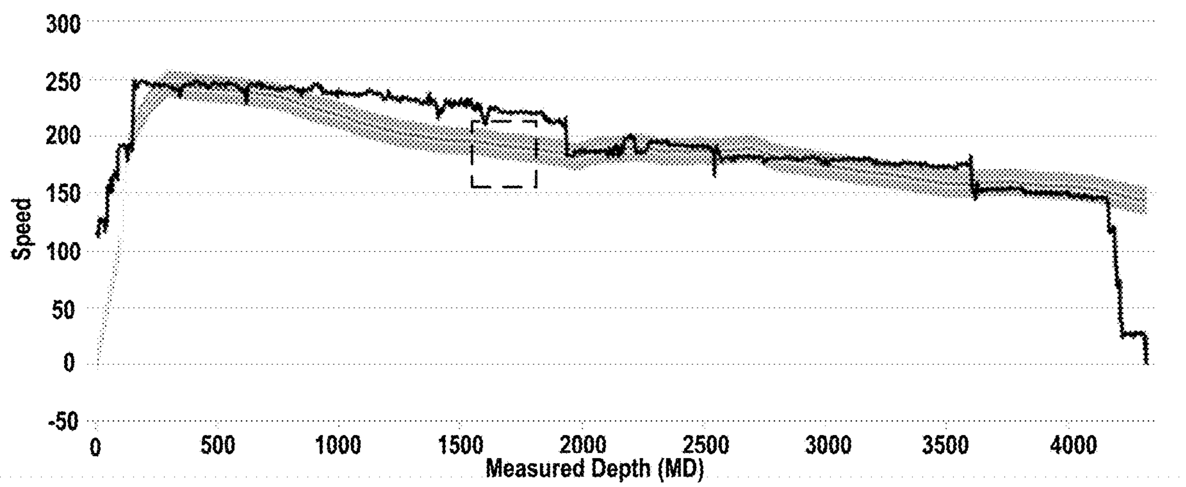
Figures 5C, 5D:
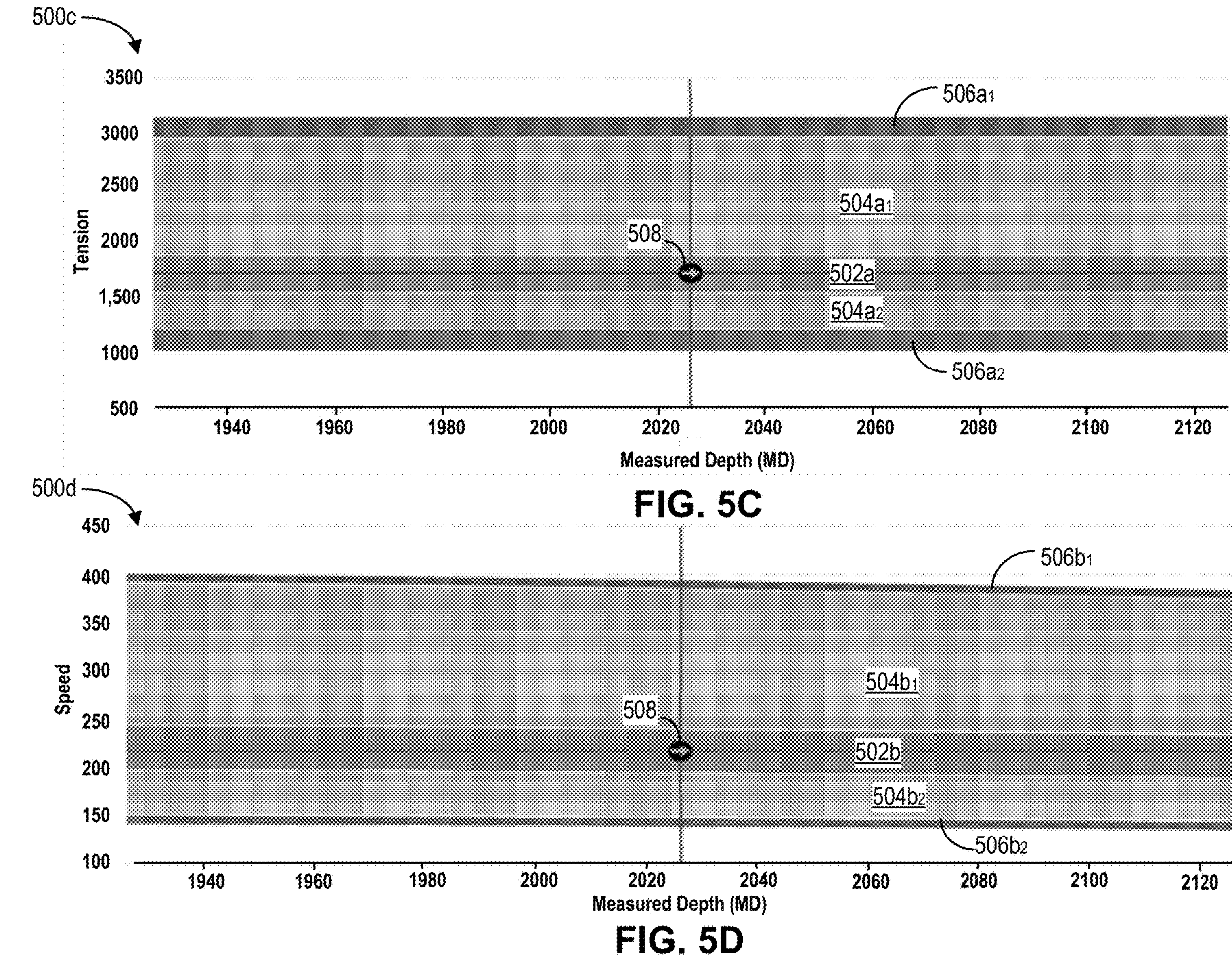
FIG. 5C is a plot showing a close-up of a portion of the plot of FIG. 5A.
FIG. 5D is a plot showing a close-up of a portion of the plot of FIG. 5B.
Figures 5E, 5F:
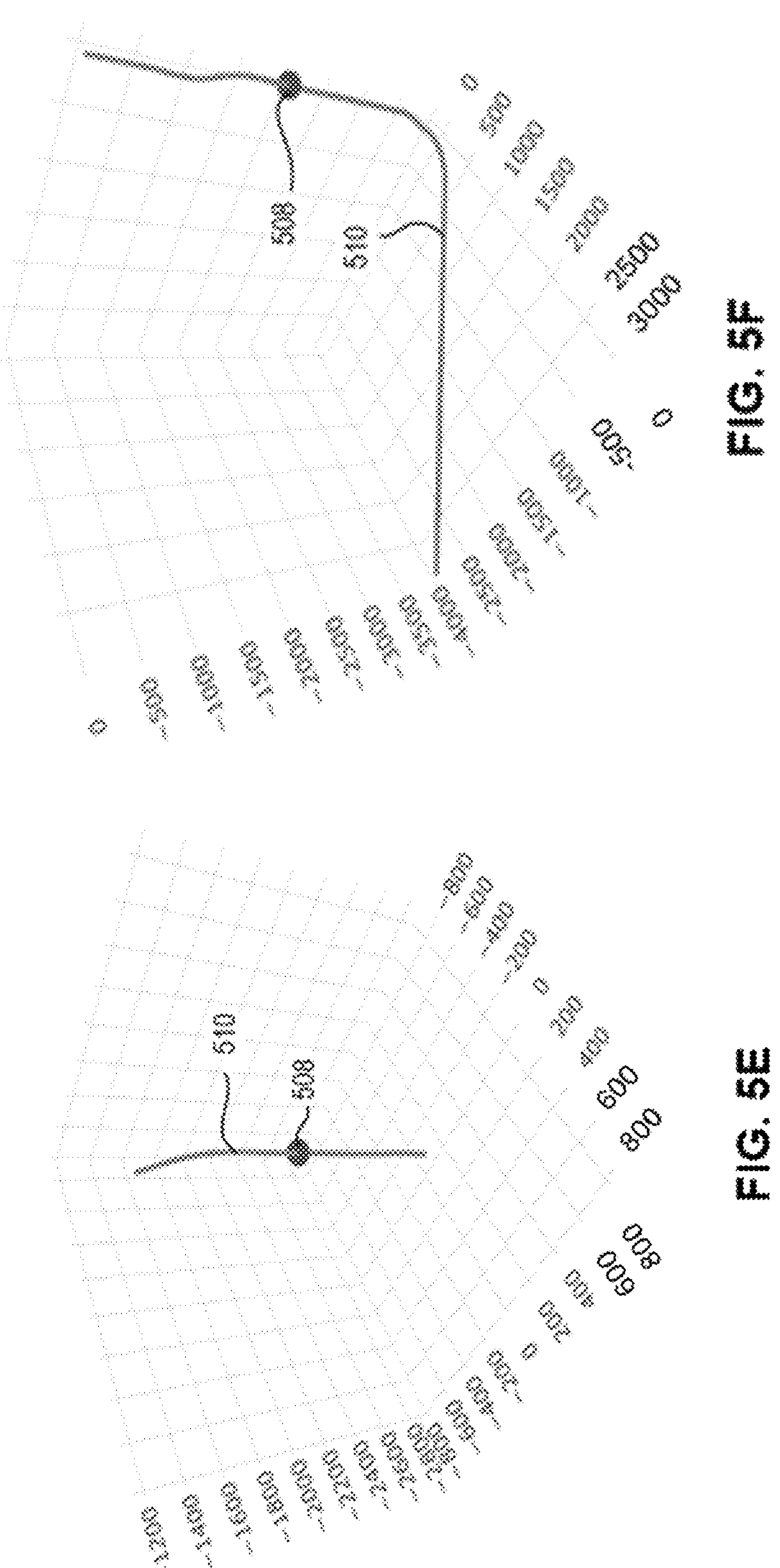
FIG. 5E is an example three-dimensional (3D) well diagram.
FIG. 5F is an another example three-dimensional (3D) well diagram.

FIGS. 5A and 5C show an example predicted optimized "tension" profile (500*a*), (500*c*) for the first stage POOH, generated by the trained initial stage model (210*c*). FIG. 5C shows a close-up of a portion of FIG. 5A.

FIGS. 5B and 5D show a corresponding predicted optimized "speed" profile (500*b*), (500*d*) for the same first stage POOH, also generated by the trained initial stage model (210*c*). FIG. 5D shows a close-up of a portion of FIG. 5B.

While FIGS. 5A-5D are in respect of the first stage POOH, the initial stage model also generates "tension" and "speed" profiles for the first stage RIH.

It is observed in FIGS. 5A and 5B, that each of the tension and speed profiles (500*a*), (500*b*) are generated along the entire "measured depth" of the well (106). This extends from the top of the well (106) (e.g., a measured depth of '0'), to the location of the first stage (e.g., near the well toe (118*c*) (FIG. 1)), see e.g., well path (510) in FIGS. 5E and 5F.

As used herein, the "measured depth" of the wireline is the depth inside the well (106), at which the bottom hole assembly (BHA) (120) is located at any given time, during RIH or POOH. It is also expressed as the depth of the terminal end of the wireline (110) at any given time within the well (106), e.g., the terminal end which ordinarily couples to the BHA (120).

Accordingly, the initial stage model (210*c*) is applied to generate a prediction of optimal speed and tension of the wireline, across the depth profile of the well. This allows an operator to understand what speed they should operate the wireline at, for each depth, to ensure that wireline tension is optimized during the entire POOH or RIH operation in the first stage.

In some examples, tension profile (500*c*) (FIG. 5C) includes an optimized tension range (502*a*). Similarly, speed profile (500*d*) (FIG. 5D) includes the corresponding optimized speed range (502*b*). Accordingly, an operator can operate the wireline within the optimized ranges. By way of example, in FIG. 5D, at a "measured depth" of approximately 2025 meters (e.g., point (508)), the operator may ensure that the wireline speed is within the corresponding optimized range (502*b*). In turn, this ensure that the wireline is experiencing the optimized tension shown in FIG. 5C. This tension is predicted by the initial stage model (210*c*) to optimize speed, while minimizing undue mechanical stress on the wireline (110).

As shown in FIGS. 5C and 5D, the trained initial stage model can also output secondary optimized ranges (504*a*), (504*b*), for operating the wireline. As compared to the ideal optimal ranges (502*a*), (502*b*)—the secondary ranges (504*a*), (504*b*) define a suboptimal range of speeds and tensions for completing the first stage. This can guide the operator to understand how far beyond the optimal range they can operate the wireline system during the first stage. For instance, in FIG. 5C, the initial stage model predicts a secondary range of optimized tensions (504*a*1), (504*a*2).

These tension ranges are above and below the optimized ideal tension range (502*a*). Similarly, in FIG. 5D, the initial stage model predicts a corresponding secondary range of optimized speeds (504*b*1), (504*b*2). These speed ranges achieve the secondary tension ranges (above), and are above and below the optimized ideal speed range (502*b*).

In still other examples, the initial stage model (210*c*) also outputs a non-operable range for wireline tension and speed. For instance, in FIG. 5C, this includes the non-operable tension ranges (506*a*1), (506*a*2). Operating the wireline in these tension ranges can cause undesired mechanical stress on the wireline (110). Similarly, in FIG. 5D, this includes the corresponding non-operable speed ranges (506*b*1), (506*b*2).

To this effect, the tension and/or speed profiles (500*a*)-(500*d*) may be displayed to the wireline system operator, before or during the first stage operation, to guide their operation. For example, the profiles can be displayed to the operator on a display interface of controller (202). In this manner, the operator can reference the displayed speed profile (500*d*) to properly control the wireline speed during first stage POOH to achieve the optimized tension profile (500*c*).

In view of the foregoing, at act (302*a*) in FIG. 3A, the initial stage model (210*c*) generates predictions for the wireline speed and tension (FIGS. 5A-5D) that can guide the operator's control of the wireline at each measured depth. The model can generate predicted outputs for both the RIH and POOH of the first stage.

While the illustrated examples show the output of the initial stage model (210*c*) as being a plot (FIGS. 5A-5D), the output can be in any other form. For example, the optimized ranges, generated by the initial stage model, can be numerical values, e.g., for speed and tension at each measured depth.

To this end, at act (302*a*) (FIG. 3A), to generate the stage-wise wireline parameters for the first stage—the initial stage model (210*c*) receives one or more input features. The input features are used by the trained initial stage model (210*c*) to generate the output at act (302*a*).

In at least one example, the input features include well-specific structural data. That is, the initial stage model (210*c*) receives various structural configuration data about the well, and uses these structural features to predict the optimized wireline parameters at each measured depth in the well. The well's structural data can be retrieved, for example, from the server (208). For instance, the well's structural data may have been previously logged, and archived in the well-specific structural database (210*a*).

Examples of well-specific structural data, that can be input features, include: (i) measured depth of the well at each depth segment; (ii) azimuth of the well along different depth segments; (iii) inclination of the well, also along different depth segments; (v) length of vertical well portion (106*a*) and horizontal well portion (106*b*); and (iv) angle of bend (106*c*). In at least one example, the input features include only the measured depth, azimuth and inclination at each depth segment.

Accordingly, at act (302*a*) (FIG. 3A), the initial stage model is trained to predict the optimized wireline parameters, and based only on the well's structural data.

Importantly, the model does not require knowledge of "operational parameters" to generate its first stage prediction. For example, aside from the well's structural configuration—to generate its predictions, the model does not necessarily require input data regarding the variable weight of the bottom hole assembly, or the pressure of the pumping fluid which carries the wireline during RIH, or other factors normally affecting the optimization of tension and speed predictions, as discussed previously. In this manner, the initial stage model provides a simplified solution for resolving initial predictions for first stage wireline operation, based only on the well's structural configuration.

As provided herein, the initial stage model is a "generic model" that is trained on data from historical wells. It is a "generic model" in the sense that it is not specifically trained on sensor data acquired from the current well. Rather, it is trained on data acquired from historical wells previously subject to well operations. This makes the initial stage model well-suited for application in the first stage of operation, before any data has been acquired for the current well.

Continuing with reference to FIG. 3A, at a subsequent point in time, at (304*a*), the wireline system is operated to complete the first stage (e.g., RIH and POOH) based on the predicted optimized wireline parameters (e.g., tension and speed) at (302*a*).

For example, a human operator can operate the wireline system (104) based on the predicted optimized speed and tension parameters. For example, the operator can control the wireline speed so that it is within the optimized speed range (502*b*), for each measured depth (FIG. 5B). In turn, this ensures that the wireline tension is within the optimized tension range (502*a*) (FIG. 5A). This can be performed for both RIH and POOH, and until the first stage is completed. In other cases, rather than relying on a human operator, the wireline system is automatically operated within the optimized speed and tension ranges.

At (306*a*), while the first stage is being completed, the wireline system (104) monitors operation of the wireline to generate measured wireline data. The measured wireline data is generated during the first stage RIH and POOH.

The measured wireline data includes, for example, the output of the sensor subsystem (206) (FIG. 2). For example, one or more sensors of the wireline measuring head (206*a*) or the BHA sensors (206*b*) can generate the measured wireline data (e.g., speed and/or tension).

More generally, the measured wireline data includes the actual measured tension and speed of the wireline during the first stage operation (e.g., RIH and POOH). The tension and speed of the wireline may be monitored across the entire measured depth (or any portion thereof), up to the location of the first stage perforating and fracturing. This allows system to compare the predicted optimized speed and tension—as output from initial stage model, at act (302*a*)—to the actual measured speed and tension.

Figure 6A:
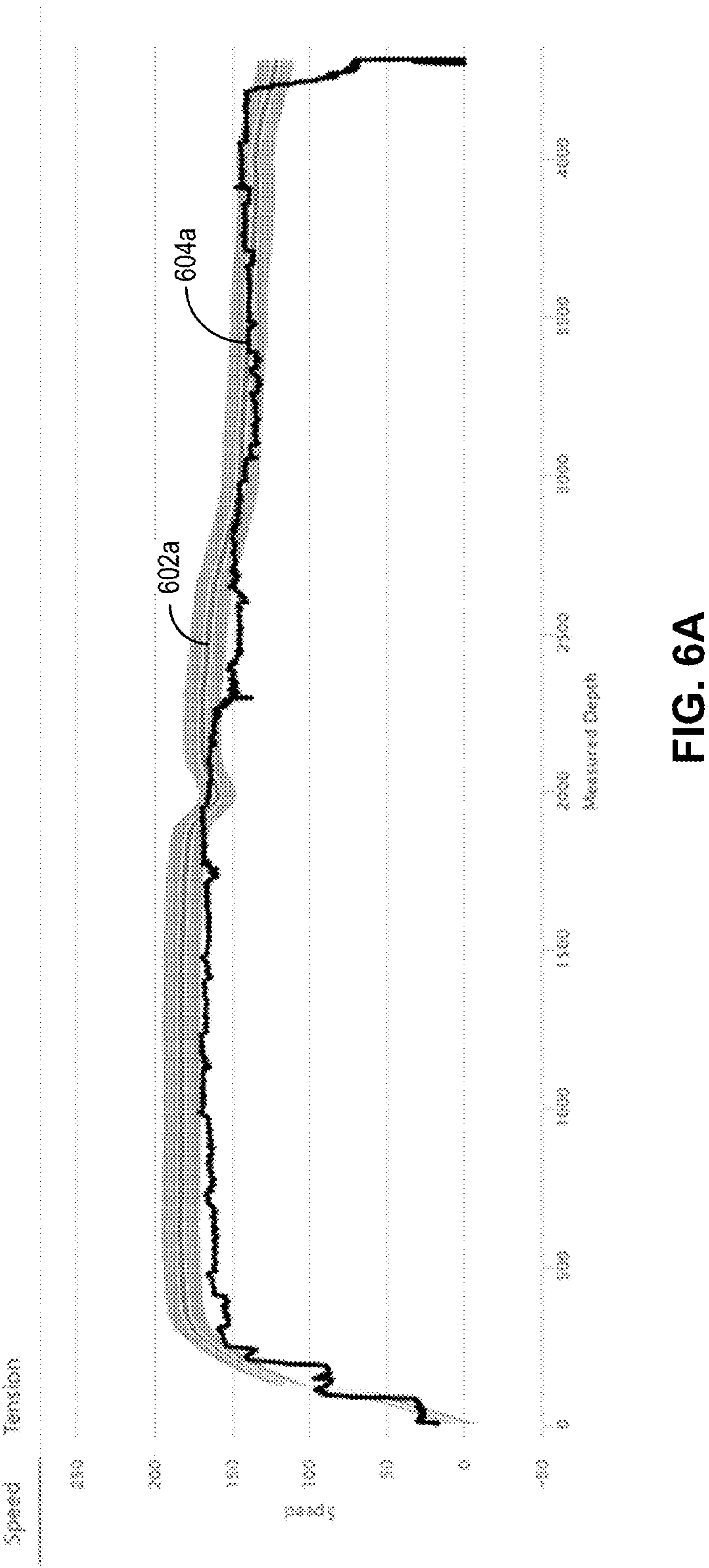
FIG. 6A is a plot of an example predicted optimized speed profile, generated by a trained initial stage model.

FIG. 6A shows a plot (600*a*) of an example prediction for optimized speed range (602*a*), for operating the wireline during the first stage RIH. This optimized speed profile (602*a*) is generated by the initial stage model (210*c*). Plot (600*a*) also shows the measured wireline speed (604*a*), generated at act (306*a*) (FIG. 3A), by the sensor subsystem (206). As shown, at each measured depth, the measured wireline speed (604*a*) is overlaid over the predicted optimized speed for that depth, to allow comparison.

Figure 6B:
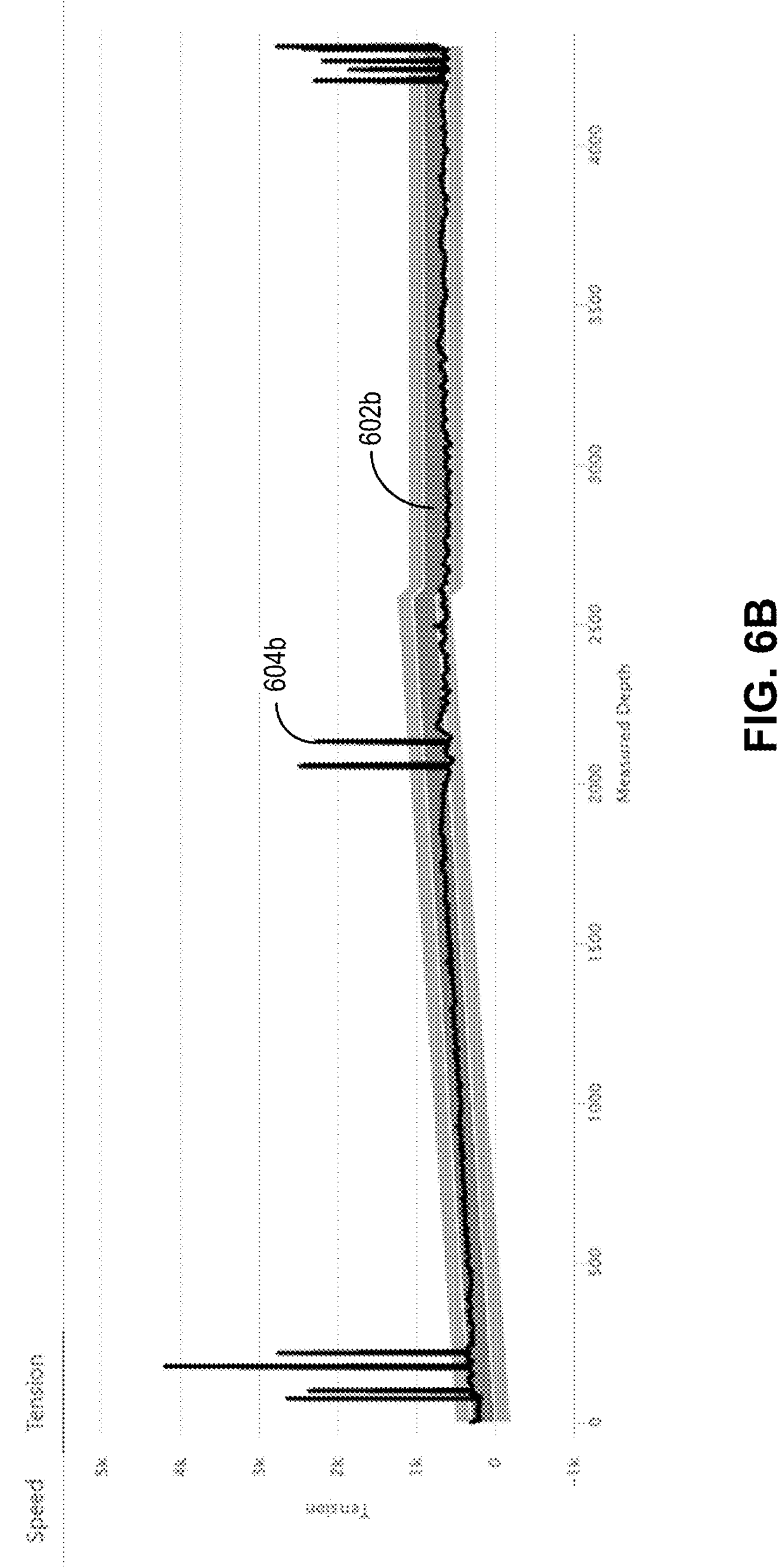
FIG. 6B is a plot of an example predicted optimized tension profile, generated by a trained initial stage model.

FIG. 6B shows a corresponding plot (600*b*) of an example prediction for optimized tension range (602*b*), for operating the wireline during the first stage RIH. The predicted tension profile (602*b*) is also generated by the initial stage model. Plot (600*b*) also shows the measured wireline tension (604*b*), generated at act (306*a*) (FIG. 3A), using the sensor subsystem (206). The measured wireline tension (604*b*) is again overlaid over the predicted optimized speed (602*b*) at each corresponding measured depth, to allow for comparison.

In at least one example, plots (600*a*) and (600*b*) are displayed to the human operator. This allows the human operator to monitor whether the measured speed and/or tension (604*a*), (604*b*) align with the suggested optimized speed and tension (602*a*), (604*a*). If they do not align, the operator can adjust wireline control to ensure they are within the optimized ranges. Plots (600*a*), (600*b*) can be generated in real-time or near real-time, to allow the operator to make real-time or near real-time adjustments.

At (308*a*) (FIG. 3A), it is determined whether the current stage (e.g., initial stage) is completed. If not, the method can return to act (306*a*) to continue monitoring, and generating the measured wireline data.

Otherwise, at (310*a*), the system may begin training the later stages model (212) (FIG. 2).

As compared to the "initial stage model", the "later stages model" is specifically trained based on the behavior of the wireline, in the current well. This is contrasted to the initial stage model, which is trained on data from past or historical wells. The later stages model is therefore used to generate more accurate predictions for optimizing wireline operation in the current well. Once the first stage is complete, the later stages model is deployed for training using the data generated from the first stage. In this manner, the "later stage model" is a "well-specific" model (rather than a more generic model), because it is trained and adapted to the particularities of the current well.

As explained later below, the later stages model is trained using three training datasets: (i) the current well's structural data; (ii) the measured wireline data from the previous stage (e.g., speed and tension, including during RIH and POOH); and (iii) the predicted wireline parameters from the previous stage—in the first iteration of method (300*a*), this prediction is generated by the initial stage model at (302*a*).

In effect, the later stages model is trained to minimize the difference between (a) measured wireline data, from the previous stage, and (b) predicted optimized speed and tension data, as determined from the previous stage. The minimizing is performed based on assessing (c) the well's structural data.

The later stages model may be trained and hosted directly on the wireline system (104) (FIG. 2). For example, as shown in FIG. 2, the later stages model (212) is trained and hosted on controller (202). In other examples, the later stages model is trained and hosted on the server (208).

At (312*a*), it is determined whether all stages are complete. If so, the method can end at (316*a*).

In some examples, once the method is complete, the wireline operation data-associated with one or more stages of the well—is uploaded to the server (208) (FIG. 2). This allows the server (208) to re-train the initial stage model using the newly uploaded data. Accordingly, the initial stage model can be refined and improved for deployment with future wells, at a later point in time.

Otherwise, at (314*a*), the later stages model is applied to predict "stage-wise" wireline parameters, for the next stage (e.g., $2^{nd}$ stage). For example, this can involve generating predictions for optimized speed and tension ranges for the next stage. The predictions can be generated over the range of measured depths, for both the RIH and POOH.

In some examples, input features into the later stages model can simply comprise the measured depth for the well at different depth segments.

The method can then return to act (304*a*) to operate the wireline for the current stage, based on the predicted wireline control parameters, at (314*a*). As the next stage is being completed, the wireline parameters are again monitored at (306*a*), and used to further train the later stages model at (310*a*). Method (300*a*) effectively iterates until all stages are completed. It will be understood that the later stages model continues to be refined and further trained, as method (300*a*) iterates over more stages.

Figure 7A:
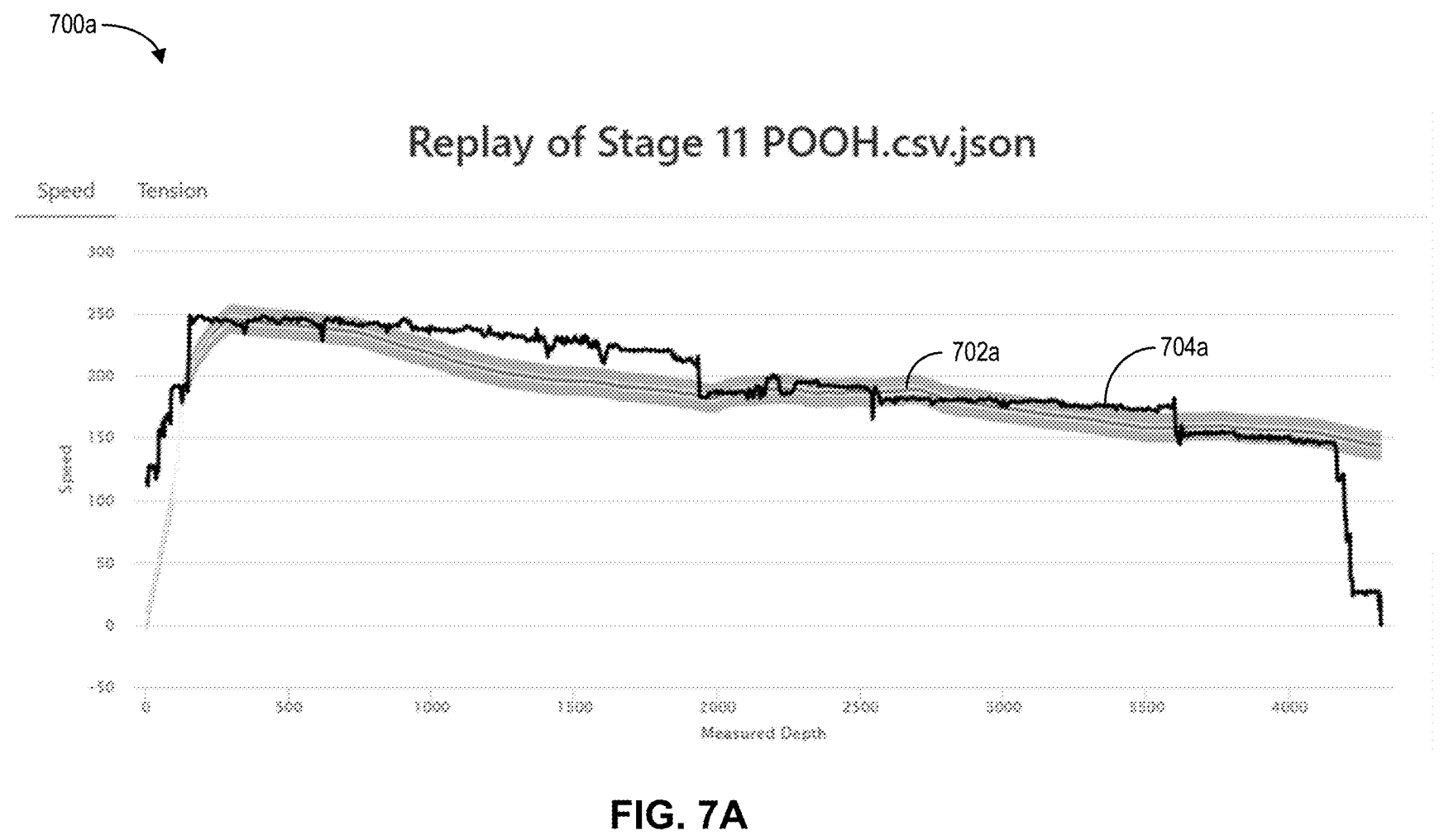

FIG. 7A shows a plot (700*a*) of an example predicted optimized "speed" range (702*a*), for operating the wireline during an $11^{th}$ stage POOH. The speed profile is generated by the later stages model at act (314*a*) (FIG. 3A). Plot (700*a*) also compares the actual measured wireline speed (704*a*), generated at act (306*a*) (FIG. 3A).

Figure 7B:
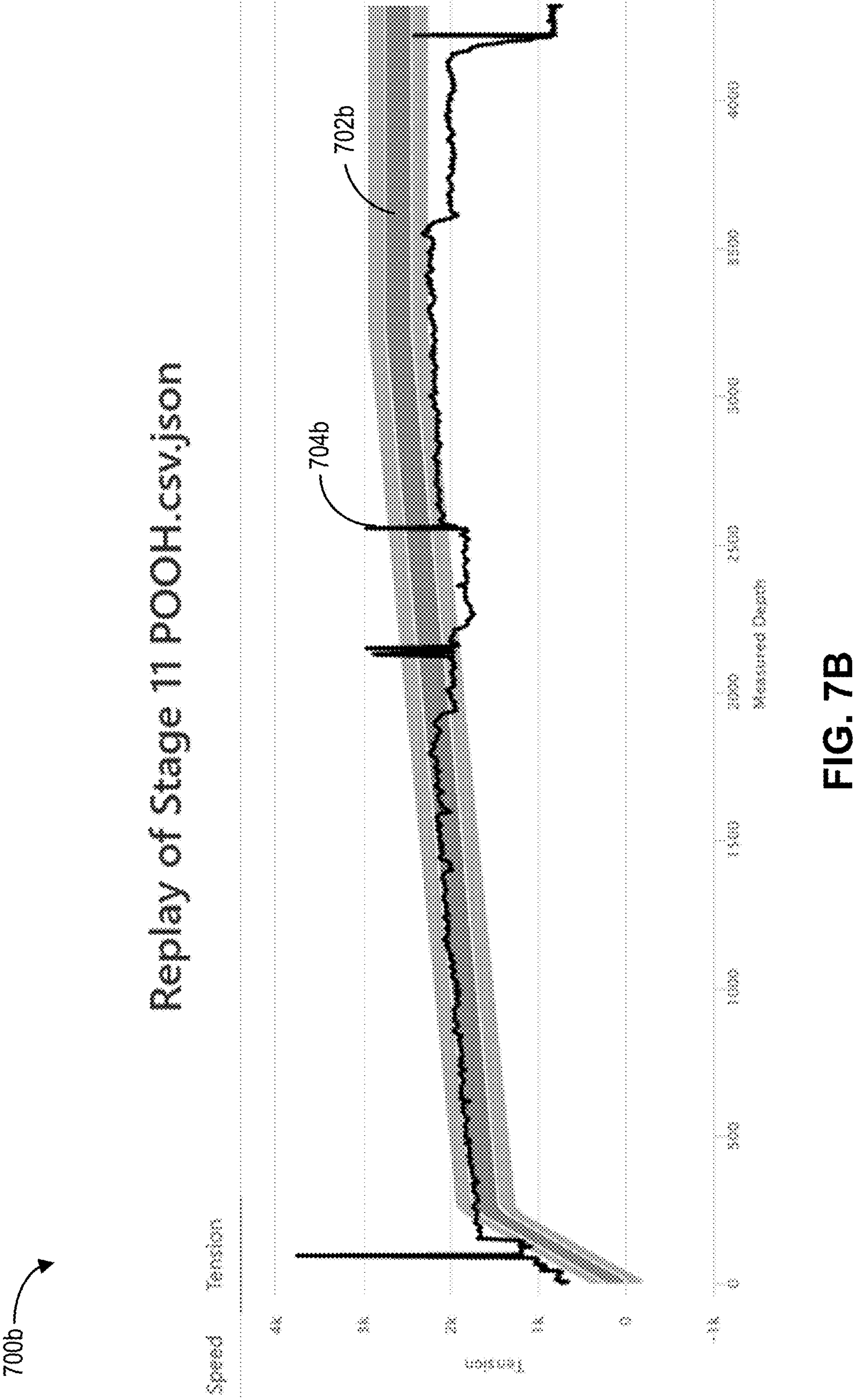
FIG. 7B is a plot of an example predicted optimized tension profile, generated by a trained later stages model.

FIG. 7B shows a corresponding plot (700*b*) of an example predicted optimized "tension" range (702*a*), for operating the wireline during the $11^{th}$ stage POOH. The tension profile is also generated by the later stages model at act (314*a*) (FIG. 3A). Plot (700*b*) also shows the measured wireline tension (704*b*), generated at act (306*a*) (FIG. 3A).

Figure 8A:
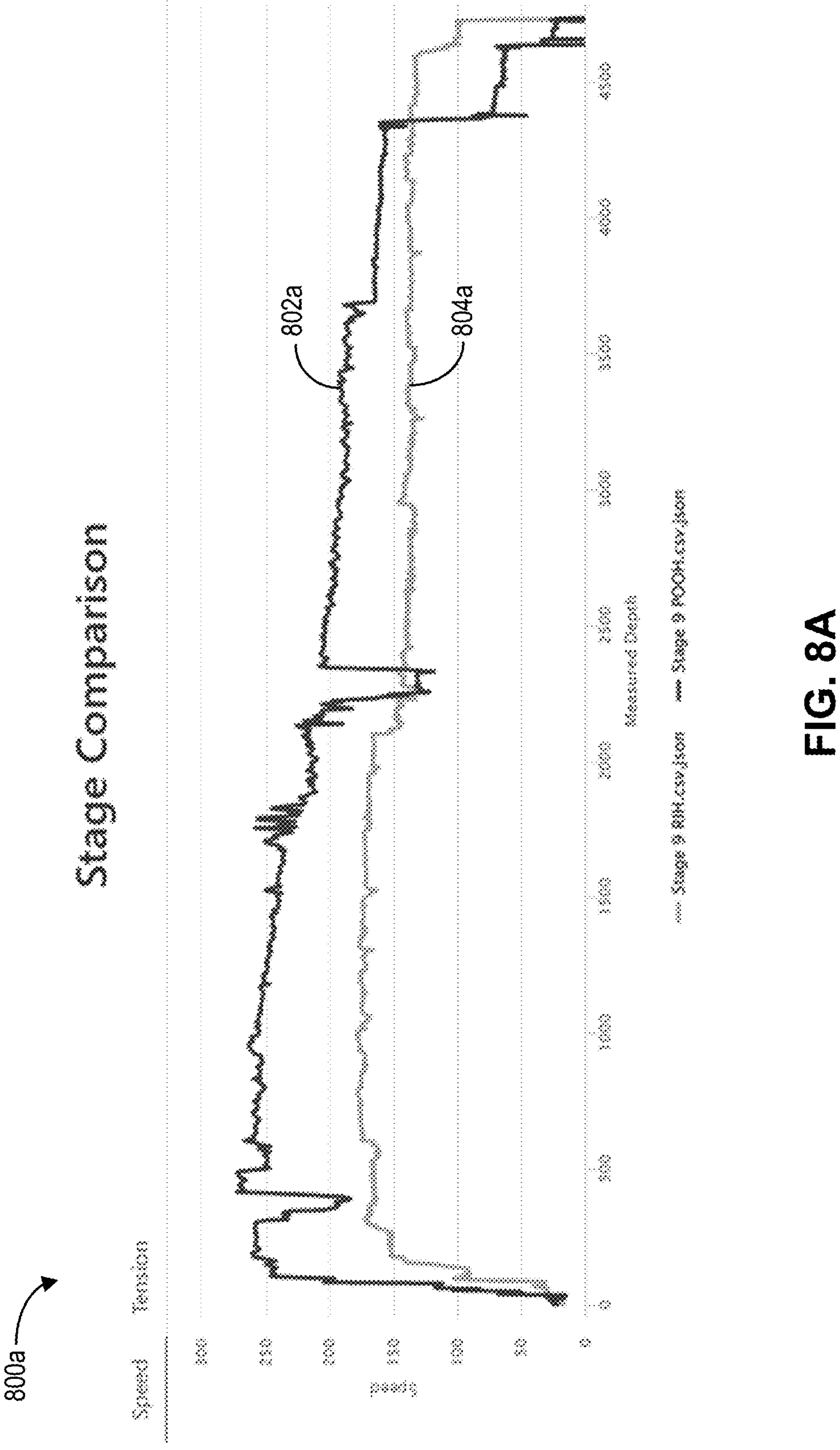
FIG. 8A is an example plot comparing the speed profile of a run in hole (RIH) and pull out of hole (POOH) process, performed in a single stage.
Figure 8B:
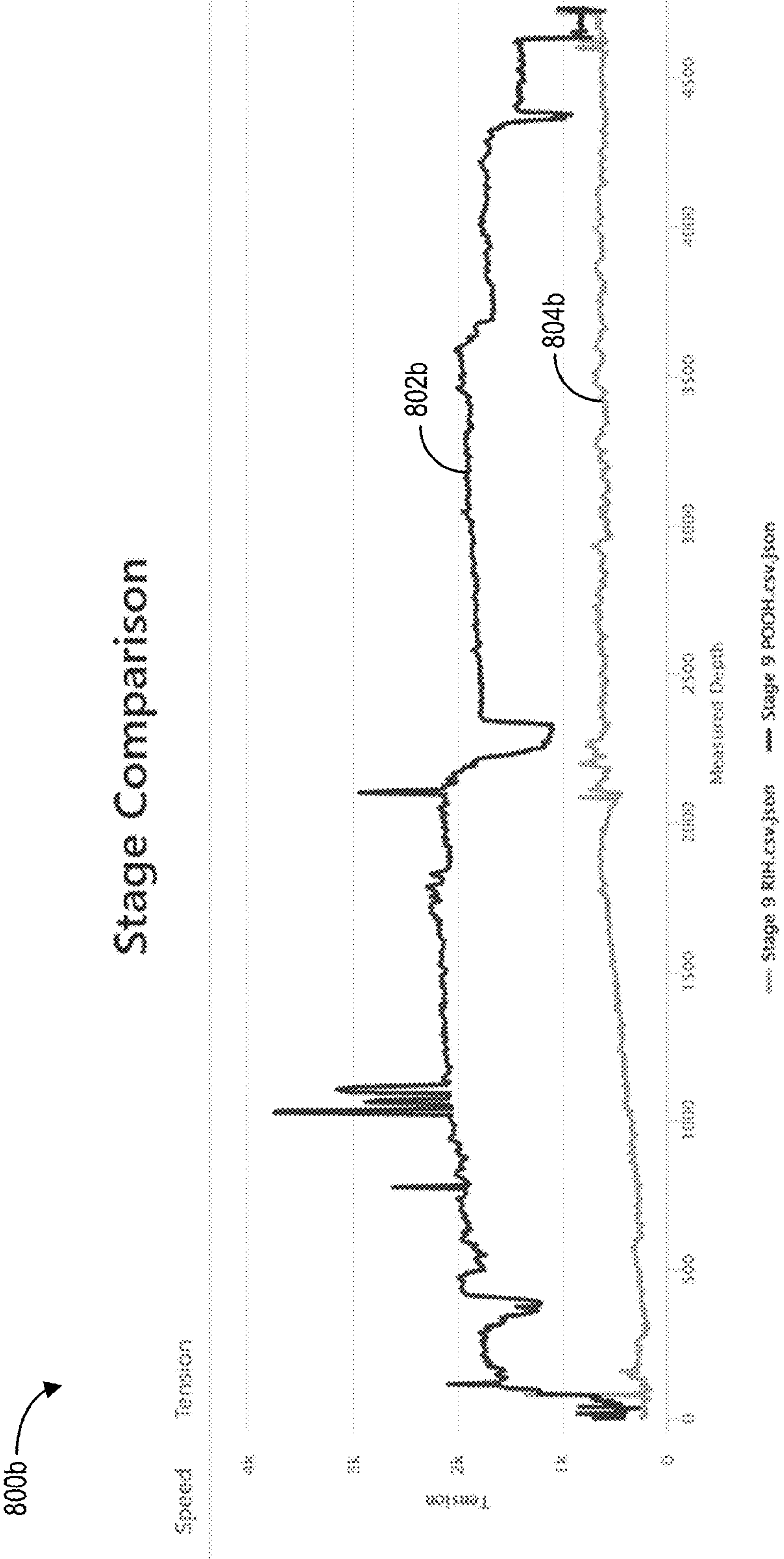
FIG. 8B is an example plot comparing the tension profile of a run in hole (RIH) and pull out of hole (POOH) process, performed in a single stage.

FIG. 8A compares measured wireline speed profile for RIH (802*a*) and POOH (804*a*) in a single stage. FIG. 8B compares measured wireline tension profile for RIH (802*b*) and POOH (804*b*) in a single stage. This information can be used to determine whether the cable is "normalized" (e.g., the inner and outer layers are balanced, and both layers share equally in the applied tension load).

In view of the foregoing, method 300*a* operates by initially deploying a "generic" initial stage model (302*a*) for generating initial predictions for the first stage of operation. Once the first stage is completed, the system acquires new data that is specific to the current well. This allows the system to use that data to train the later stage model to generate new predictions for every later stage, after the first stage. As each new stage is completed, the system acquires even more data that can be used to further re-train and improve the later stage model. The later stage model eventually becomes refined over time to generate accurate predictions that are specific to the current well.

(ii.) Training Initial Stage Model

Figure 3B:
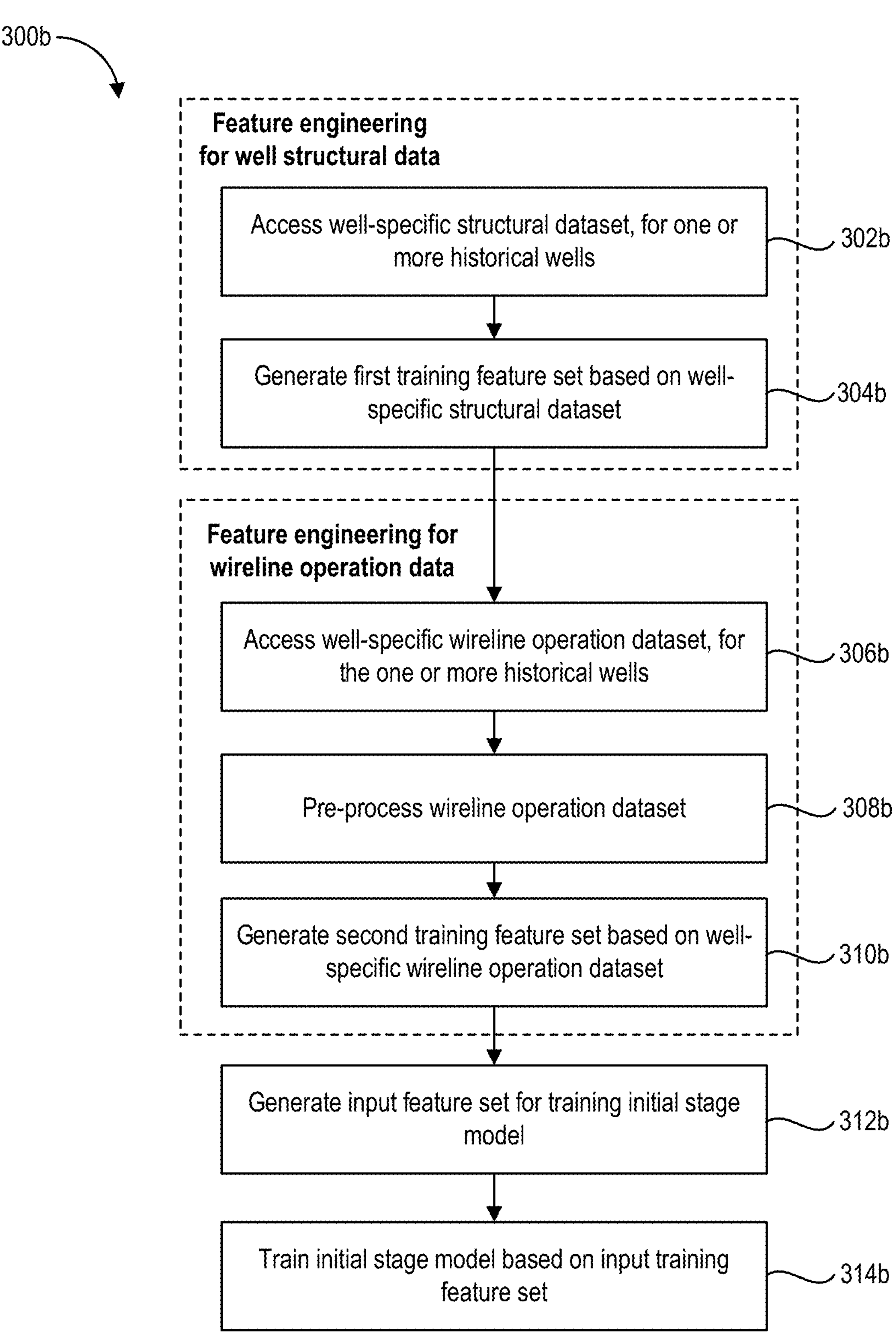
FIG. 3B is a process flow of an example method for training an “initial stage” machine learning model.

FIG. 3B shows a process flow for an example method (300*b*) for training the initial stage model. Method (300*b*) can be executed by at least one processor of the server (208) (FIG. 2), or any other computing device.

As described above, the initial stage model is used during act (302*a*), of method (300*a*). The initial stage model generates initial predictions for optimized wireline parameters, for controlling the wireline during the first stage of the wireline operation (e.g., FIGS. 5C and 5D). This includes predictions for both optimized tension and speed values, during first stage RIH and POOH.

At a general level, the initial stage model is trained based on data associated with historical wells. Historical wells refer to wells which were subject to previous wireline operations (e.g., plug-and-perf operations).

The model is trained to learn the correlation between: (a) the structural data of historical wells (e.g., depth, inclination and azimuth), as well as predicted tension and speed values for each stage of the historical well, and across the entire measured depth for that stage (i.e., assuming the models were applied to these wells), and (b) the actual measured wireline speed and tension properties of these wells, across different stages, and across the entire measured depth for that stage (or any portion thereof). The trained model leverages this training, to generate an initial prediction for the first stage of a new well, based on its structural data.

Method (300*b*) is generally executed prior to executing method (300*a*). This allows the initial stage model to be trained for use at act (302*a*), of method (300*a*).

Method (300*b*) can also be continuously trained, after the completion of method (300*a*). For example, once method (300*a*) is completed for a new well (e.g., the plug-and-perf operation is completed at act (316*a*) in FIG. 3A), the wireline data for that well is uploaded to further train the initial stage model. That is, the completed well becomes a new historical well, for the purposes of re-training the model.

Now in more detail, at (302*b*), for each historical well, the system accesses the well-specific structural data for that well. In some examples, the structural data is stored on—or otherwise accessible—on a memory of the server (208). For example, the structural data of each well is stored in the well-specific structural database (210*a*), on server (208) (FIG. 2).

The structural data for each historical well can include, by way of non-limiting examples: (i) measured depth of the well; (ii) azimuth of the well, including the azimuth at different depth segments of the well; (iii) inclination at different depth segments of the well; (iv) length of vertical well portion (106*a*) and horizontal well portion (106*b*); and (v) angle of bend (106*c*).

At (304*b*), for one or more historical wells, the system can generate one or more training features based on the well's structural data.

In at least one example, the training features generated at (304*b*), are derived from the accessed structural data. The training features can include, by way of non-limiting examples: (i) the cosine and sine of azimuth; (ii) distance to and from kickoff (118*a*) (FIG. 1); (iii) shifted inclination value of the well (e.g., changing inclination of well at different depth segments); (iv) mean values of inclination and azimuth; and (v) measured depth of well.

At (306*b*), for each historical well used at (302*b*), the corresponding wireline operation data is accessed (i.e., well-specific wireline operation data).

As noted previously, the wireline operation data for a historical well can include: (i) measured wireline data for the well—e.g., measured speed and tension values of the wireline through each stage, inclusive of RIH and POOH, and at various measured depths; and (ii) predicted optimized stage-wise wireline parameters for the well—e.g., predicted optimized speed and tension ranges for each stage, as generated by the machine learning models disclosed herein (e.g., inclusive of RIH and POOH, and at various measured depths). The predictions may have been generated by applying either the initial stage model or a later stage model, to that well. In some examples, the stage data per historical well is grouped, and the fastest speed recorded (e.g., $90^{th}$ percentile) is used for training.

In at least one example, the historical wireline operation data for each historical well includes a plurality of data entries expressed as follows:

TABLE 1

| Example Wireline Operation Data | | | | |
|---|---|---|---|---|
| | Time Stamp | Measured Depth | Measured Wireline Data | Predicted Optimized Wireline Parameters |
| Data Entry #1 | X:XX | Z meter | Measured tension & speed readings | Predicted tension & speed |

TABLE 1-continued

| Example Wireline Operation Data | | | | |
|---|---|---|---|---|
| | Time Stamp | Measured Depth | Measured Wireline Data | Predicted Optimized Wireline Parameters |
| Data Entry #2 | X:XY | Z meter | Measured tension & speed readings | Predicted tension & speed |

Accordingly, each data entry-forming part of the historical wireline operation data—is associated with a timestamp and the measured depth it was collected at.

In some examples, the historical wireline operation data is stored (e.g., archived)—in association with each well-on a memory of the server (202), or any other accessible memory location (see e.g., (210*b*) in FIG. 2). For instance, after a well is completed, the control system (202) can transmit the wireline operation data to the server (or other memory) for storage. In this manner, the dataset can be accessed, at (306*b*), from the server memory, or other memory.

At (308*b*), in some cases, the wireline operation data, for the one or more historical wells, can be pre-processed. For example, this can include removing invalid data, anomalous data and/or sensor noise. The pre-processing of the data is explained in further detail, in FIG. 3D.

At (310*b*), the pre-processed wireline operation data is analyzed to generate a corresponding second training feature set, for the one or more historical wells used for training.

To generate the second feature set, at (310*b*), each data entry in the pre-processed wireline operation data is annotated with associated information, including: (i) the stage; (ii) the stage process (e.g., RIH or POOH); and (iii) the portion of the well (e.g., the vertical, horizontal or kickoff), at which the data point was collected. In some examples, the wireline operation data is manually annotated with this information. The portion of the well, where the data point was collected, may be automatically determined based on the measured depth and/or inclination, associated with that data point.

At (312*b*), the input feature set is generated for training the initial stage model. In particular, the input feature set includes, for each historical well: (i) the structural training features (304*b*); and (ii) the wireline operation training features (310*b*). The targets, for model training, are selected as the measured wireline parameters (e.g., speed), at each process (RIH and POOH) in each stage, and across the range of measured depths.

At (314*b*), the initial stage model is trained based on the generated input feature set, for each historical well.

(iii.) Training Well-Specific "Later Stages" Model

As noted in FIG. 3A, the later stages model is trained to predict optimized stage-wise wireline parameters (e.g., speed and tension), for the specific well being operated on. This is contrasted to the initial stage model, which is trained more generically, on previous historical wells.

As also explained in FIG. 3A, the later stages model is trained and re-trained after completing each new stage in the wireline operation (e.g., plug-and-perf operation). This allows the model to generate more accurate and enhanced predictions, for optimized wireline speed and tension, for each upcoming stage.

Figure 3C:
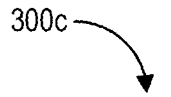
FIG. 3C is a process flow of an example method for training a well-specific “later stages” machine learning model.
Figure 3C:
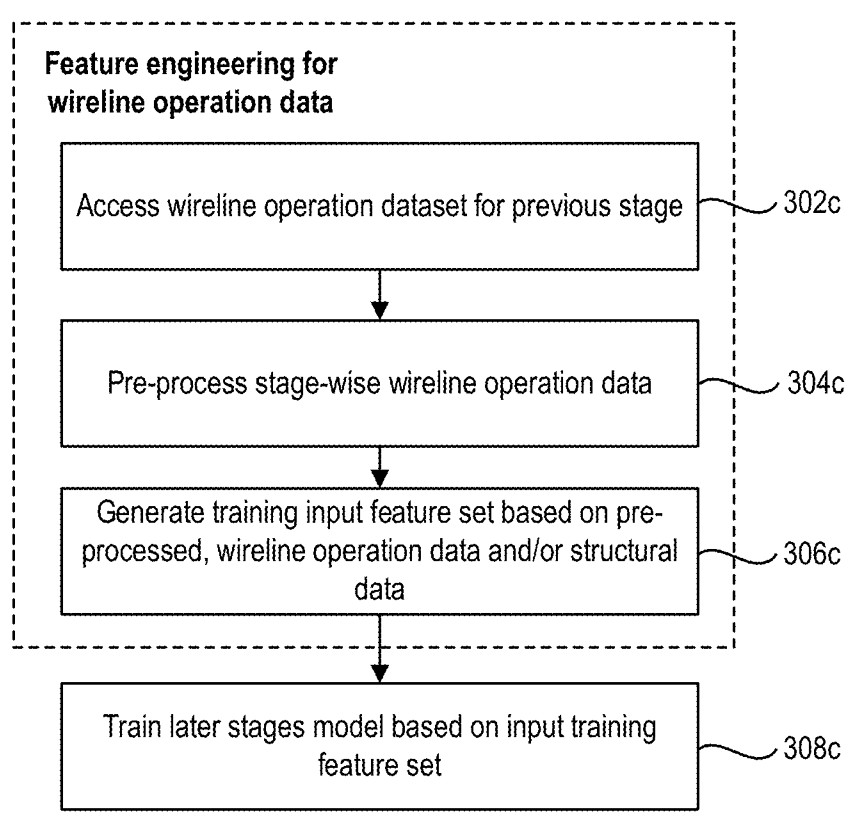

FIG. 3C shows a process flow for an example method (300*c*) for training the later stages model. In some examples, method (300*c*) is executed by at least one processor of the controller (202) and/or server (208) (FIG. 2).

As shown, at (302*c*), the system accesses the wireline operation data for the previous stage (i.e., the "stage-wise" wireline operation data).

The stage-wise wireline operation data includes, for example: (i) the measured tension and speed across the range of measured depths for each process (e.g., RIH and POOH) in the previous stage; and (ii) the corresponding predictions for the optimized tension and speed ranges, across the range of measured depths, for each process (e.g., RIH and POOH) in the previous stage. More generally, each data entry of the previous stage's wireline data can be as shown in Table 1, above.

At (304*c*), in some examples, the stage-wise wireline operation data is pre-processed. For example, this can include removing invalid data, anomalous data and/or sensor noise. The pre-processing of the data is explained in further detail, in FIG. 3D.

At (306*c*), the system generates a training input feature set based on the pre-processed wireline operation data, generated in the previous stage. The generated input features are used to train the later stages model.

In at least one example, the generated input features are derived from the wireline operation data for the previous stage, and include: (i) mean recorded speed of previous stage, per depth segment; (ii) mean recorded tension of previous stage, per depth segment; (iii) mean recorded inclination of previous stage, per depth segment; and (iv) optimal tension and speed ranges according to standard operating procedure for next stage, per depth (e.g., suggested minimum and maximum limits for tension and speed).

The generated input features can also include annotating, each data point in the wireline operation data, with its corresponding stage process (e.g., RIH or POOH), and well section (e.g., vertical, horizontal or kick-off). In some examples, stage and stage process can be manually annotated, while the well portion can be determined, e.g., automatically, based on measured depth and/or inclination values.

In some examples, the input features also include well-specific structural data. This includes the depth and inclination of the well, for each data point in the previous stage.

At (308*c*), the later stages model is trained based on the input training feature set, generated at (306*c*). The target variables in the training are the measured speed for the previous stage, per depth segment.

As explained previously, method (300*c*) can be iterated after each stage of the wireline operation, such that the later stages model is continuously trained and re-trained based on the previous stage data.

(iv.) Pre-Processing of Training and Inference Data

Figure 3D:
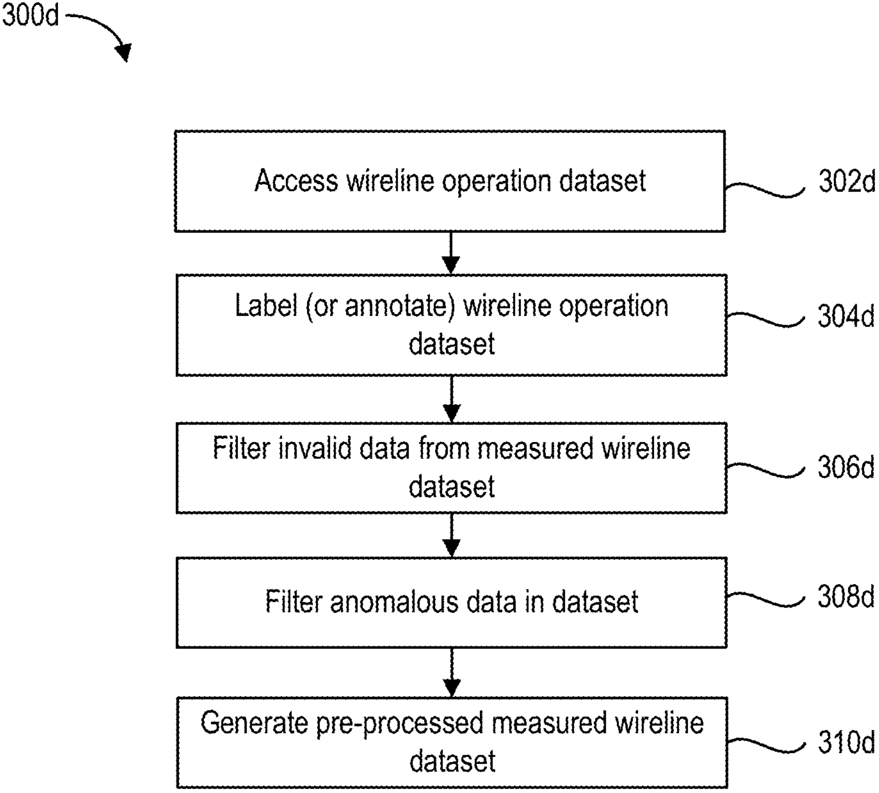
FIG. 3D is a process flow of an example method for pre-processing wireline operation data.

FIG. 3D shows a process flow for an example method (300*d*) for pre-processing wireline operation data. Method (300*d*) can be used to remove invalid and/or anomalous data entries and datasets.

In some examples, method (300*d*) is applied to pre-process wireline operation datasets, used for training machine learning models. For example, method (300*d*) is applied during either act (308*b*) in method (300*b*) (FIG. 3B) and/or act (304*c*) in method (300*c*) (FIG. 3C). Accordingly, this enhances the efficacy and accuracy of the training process.

Method (300*d*) can also be applied during the model inference stage. For instance, prior to inputting wireline operation data into the trained "later stages" model, at act (314*a*) (FIG. 3A), the data is pre-processed using method (300*d*), e.g., to remove an invalid or anomalous data.

As shown, at (302*d*), a wireline operation dataset is accessed, for pre-processing. This can either be a dataset being used for training a model, or otherwise, used during a model's inference stage.

As indicated previously, the wireline operation data can include: (i) measured wireline data (e.g., tension and speed) at measured depth intervals; and (ii) corresponding predictions for optimized wireline parameters, at the measured depth intervals. The wireline operation data can be time stamped. In some example, each data entry is as shown in Table 1, above.

At (304*d*), the wireline operation dataset is labelled or annotated. For example, this includes annotating sub-datasets as associated with: (i) stage process (e.g., RIH or POOH); and/or (ii) the well portion in which it was collected (e.g., vertical section, horizontal section, kickoff).

At (306*d*), invalid data may be filtered from the wireline operation data. This includes checking for any missing data. For example, if at certain timestamps, there are missing: (i) measured speed or tension data; or (ii) predicted optimized speed or tension data, the data entry can be deemed as invalid. Accordingly, the data entry is removed.

In some examples, if invalid data is detected, only a small portion of data around the invalid data may be removed. In other examples, data associated with the entire stage is removed, e.g., if the data (e.g., speed and tension) is outside of a pre-defined "envelope".

At (308*d*), anomalous data is also filtered from the wireline operation dataset. In some examples, anomalous data is identified by analyzing the data using on one or more pre-defined anomaly criteria. The anomaly criteria can include, by way of non-limiting examples:

(i) Fragmented or Incomplete Dataset: Each of the RIH and POOH sub-datasets are analyzed to determine if they are incomplete. This can result from the sub-dataset not including data entries across all measured depths of the well.

Figures 9A, 9B:
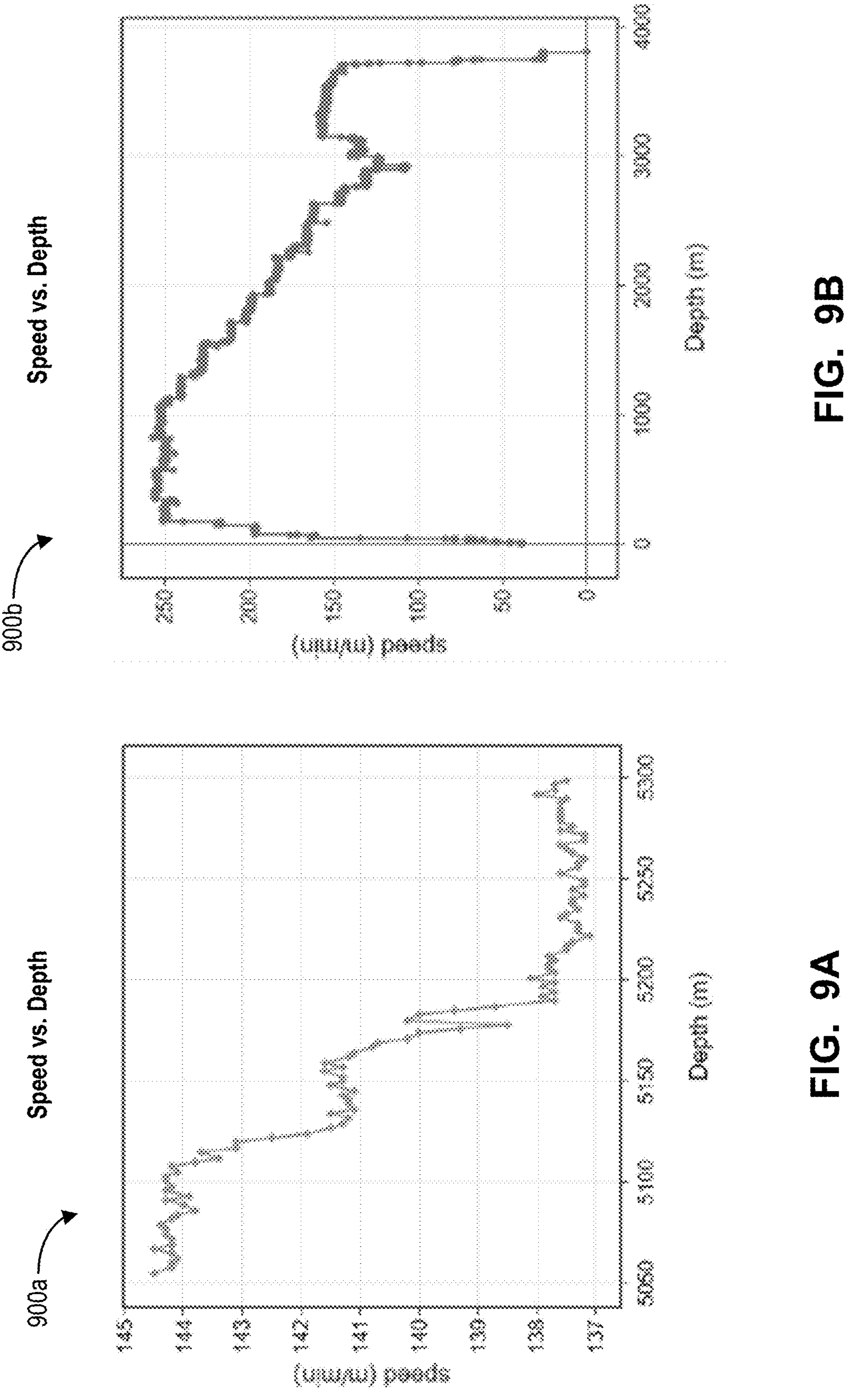
FIG. 9A is a plot showing an example fragmented dataset.
FIG. 9B is a plot showing an example incorrectly classified dataset.

FIG. 9A shows an example plot (900*a*) of an incomplete dataset for measured wireline speed, during a POOH process. As shown, the data entries span measured depths between 5,300 meters to 5,050 meters. Accordingly, data entries are missing from 5,050 meters to 0 meters, as the wireline is being pulled out of hole. This can result, for example, from the wireline operator forgetting to hit record, or otherwise pre-maturely stopping recording. Accordingly, the POOH sub-dataset can be flagged and removed as being anomalous.

(ii) RIH and POOH in Same Recording: This can be determined based on considering whether the measured depth increases (RIH) and decreases (POOH), in the same recording.

(iii) Stopped Recording Multiple Times During Operation: For example, this can include cases where the measured depth, in the recorded data, does not start at zero (or at the toe), and only shows a portion or fragment of the well.

(iv) Mislabeled RIH with POOH (or vice-versa): This can be determined based on monitoring the measured depth. For example, if the measured depth increases over time, the data corresponds to an RIH, while if it decreases it corresponds to a POOH (FIG. 9B). Accordingly, the system can use the measured depth to determine if a data segment was correctly or incorrectly labelled as associated with RIH or POOH.

(v) Running at Very High Speeds: The speed can be calculated as distance over time. A determination is made as to whether the speed is above a pre-defined threshold.

At (310*d*), the pre-processed measured wireline dataset is generated.

IV. EXAMPLE TRAINING OF MACHINE LEARNING MODELS

The machine learning models described herein (e.g., the initial stage model and the later stages model) can be trained using various machine learning training techniques at acts (314*b*) (FIG. 3B) and (308*c*) (FIG. 3C). In some examples, the models are trained using supervised learning techniques, as known in the art.

In at least one example, the supervised learning technique used for separately training each of the disclosed models is an LGB (Light Gradient Boosting) Regressor training methodology. The training can be performed using a Sklearn pipeline, whereby numerical features are standardized using a 'Standard Scale', and categorical features (e.g., well portion (e.g., vertical or horizontal), and well process (e.g., RIH v. POOH)) are one hot encoded using 'OneHotEncoding' sklearn method. A grid search cross-validation (CV) can be applied to fine tune hyper-parameters and obtain the best model optimizing the RMSE metric.

Tables 2 and 3, below, summarize example optimized hyper-parameters used to train the initial stage model (Table 2), and the later stages model (Table 3). The following parameters were selected using a grid search CV method, using five (5)-fold cross validation, with the goal of optimizing root mean square error (RMSE).

TABLE 2

Example Optimized Hyper-Parameters for Initial Stage Model
Initial Stage Model

| Boosting type | GBDT (Gradient-Boosted Decision Tree) |
|---|---|
| Learning Rate | 0.01 |
| Maximum Depth | 10 |
| Minimum Child Samples | 20 |
| Minimum Child Weight | 0.001 |
| Number of Estimators | 500 |
| Regularization Parameter: alpha | 0.2 |

TABLE 3

Example Optimized Hyper-Parameters for Later Stages Model
Later Stages Model

| Boosting type | GBDT (Gradient-Boosted Decision Tree) |
|---|---|
| Learning Rate | 0.1 |
| Maximum Depth | −1 |
| Minimum Child Samples | 20 |
| Number of Estimators | 100 |
| Minimum Child Weight | 0.001 |
| Regularization Parameter: alpha | 0 |

The LGB (Light Gradient Boosting) machine was selected because it was found to effectively handle non-linear relationships in data. Further, LGB has mechanisms including max depth, alpha parameter for regularization to control overfitting and generalizes better to unseen data. It is known for its fast training speed and scalability, making it suitable for large datasets with many features.

V. EXAMPLE METHODS FOR OPERATING WIRELINE SYSTEM

The following are example methods for operating the wireline system (104). This includes manual operation, by a human wireline system operator (FIG. 4A), as well as automated operation (FIG. 4B).

(i.) Manual Operation

Figure 4A:
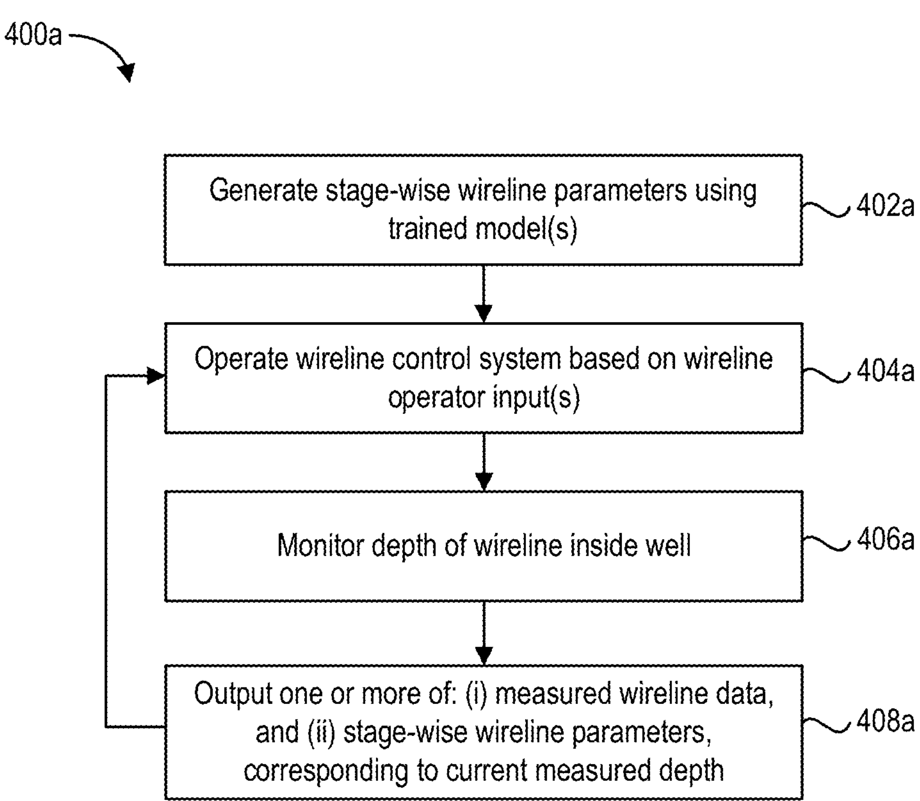
FIG. 4A is a process flow of an example method for manual operation of a wireline system.
Figure 4B:
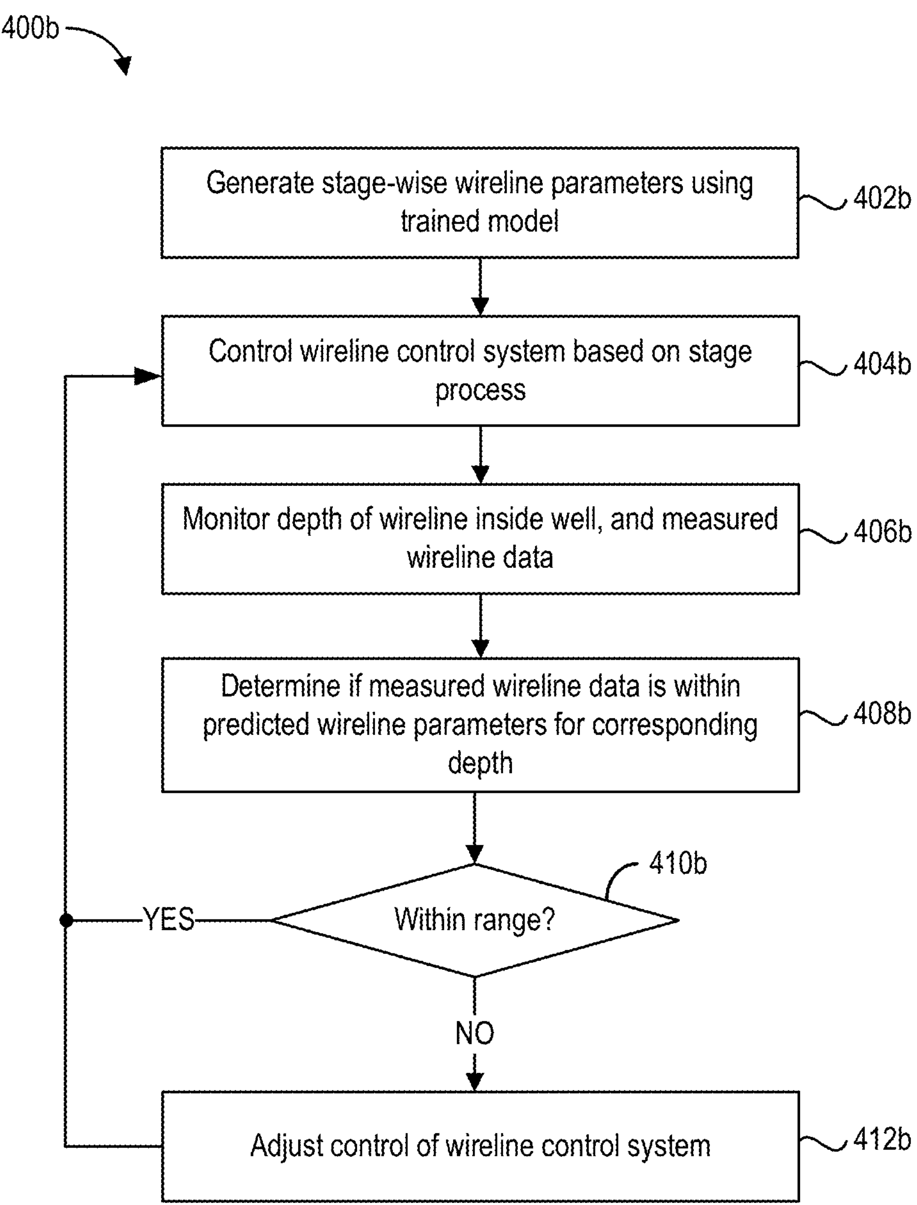
FIG. 4B is a process flow of an example method for automated operation of a wireline system.

FIG. 4A shows is a process flow for an example method (400*a*) for manually operating the wireline system (104), e.g., by a human operator.

At (402*a*), the system generates the stage-wise wireline parameters using the trained machine learning models. The stage-wise wireline parameters include the optimized speed and/or tension ranges, across the range of measured depths for both RIH and POOH. For example, the stage-wise parameters can be output in the form of a plot, as shown in (602*a*) in FIGS. 6A, and (602*b*) in FIG. 6B.

If the wireline operation is still at the first stage, then act (402*a*) generates the parameters using the trained initial stage model, e.g., at (302*a*) in FIG. 3A. Otherwise, if the wireline operation is at any other subsequent stage, then act (402*a*) generates the parameters using the trained later stages model, e.g., at (312*a*) in FIG. 3A.

At (404*a*), the wireline control system (204) (FIG. 2) (e.g., wireline drum motor) is operated (e.g., controlled) based on inputs by the human wireline operator. For example, the wireline operator controls the wireline control system (204) using an input interface of controller (202). This allows the operator to control and adjust the speed of the wireline during RIH or POOH.

At (406*a*), the system monitors the depth of the wireline inside the well (106). For example, the depth is monitored using the sensor subsystem (206). For instance, this can include depth sensors in the bottom hole assembly (BHA) (120), as known in the art (FIG. 1). In other cases, the depth is measured based on the amount of wireline drawn out, or retracted, by the wireline drum (104), as determined by rotation sensors coupled to the drum or motor.

At (408*a*), the system outputs the predicted stage-wise wireline parameters corresponding to the current measured depth of the wireline. For example, the system can output-on a display interface of controller (202)—the predicted optimized ranges for the wireline speed and tension, at the current measured depth, as generated by the initial stage or later stages machine learning model.

For example, in FIGS. 5A and 5B, at depth (508), the system outputs the corresponding suggested optimized speed and tension at that depth, and for RIH or POOH. Accordingly, the wireline operator is able to control, at least the wireline speed, to match the suggested optimized speed. This allows the operator, in turn, control the applied tension on the wire.

The system can also output the measured wireline data for the wireline (e.g., measured tension and speed readings), which are also generated by the sensor subsystem (206). In some cases, this is output in real-time, or near real-time, e.g., on a display interface of controller (202).

In this manner, the operator can view the current speed and tension of the wireline, and adjust control of the wireline to ensure that the speed and tension are within the optimized suggested tension and speed ranges.

In some examples, a three-dimensional (3D) well diagram can also be displayed to the human operator. For instance, these can include well diagrams as shown in 3D plots (500*c*), (500*d*) in FIGS. 5C and 5D. In this manner, the operator can also track the measured depth of the wireline in 3D.

Method (400*a*) can iterate until the wireline operation is completed.

(ii.) Automated Operation

FIG. 4B shows an example method (400*b*) for automated operation the wireline system (104).

At (402*b*), the system generates the stage-wise wireline parameters using the trained machine learning models. This act is analogous to act (402*a*), of method (400*a*), At (404*b*), the controller (202) automatically operates the wireline control system (204) based on the stage process (e.g., RIH or POOH). For example, the controller (202) transmits control data to the wireline drum motor to release or retract the wireline.

At (406*b*), the controller (202) monitors the depth of the wireline inside the well, e.g., using sensor subsystem (206). Controller (202) also monitors the measured wireline data at the corresponding depth (e.g., wireline speed and/or tension), e.g., based on speed and tension sensors in the sensor subsystem (206).

At (408*b*) and (410*b*), controller (202) determines if the measured wireline data is within the predicted, optimized ranges for the corresponding depth. For example, this involves determining if the current wireline speed and/or tension, are within the optimized tension and/or speed ranges at that depth.

If the measured data is not within the desired ranges, then at (412*b*), controller (202) automatically adjusts the wireline control subsystem (204), to adjust the speed to be within the range. Otherwise, at (404), the system returns to (406*b*) to continue controlling and monitoring.

VI. ALTERNATIVE AND/OR SPECIFIC EXAMPLES

In at least one example, the initial stage model also generates, at (302*a*) (FIG. 3A), a confidence level score for its predicted first-stage wireline parameters. The confidence score expresses a level of similarity between the structural properties of the current well, and the structural properties of historical wells used to train the model. The confidence level score defines a similarity index, with higher confidence levels assigned to wells that have more similar historical data.

More generally, each historical well may be characterized by a number of structural features. A multidimensional space is generated, wherein each historical well is represented as a data point within the multidimensional space, based on its structural features. Using the multidimensional space, the system can consider how far the structural properties of the current well are, from historical wells. This is accomplished by defining a hypersphere around the data point representing the structural feature of the current well (i.e., within the multidimensional space), and confirming the number of points within that hypersphere, which represent other historical wells. The similarity index may correspond to the distance between the current well data point, and a historical well data point within that hypersphere.

By incorporating confidence level scores, the system provides more accurate and reliable recommendations for new wells to the operator, while also providing operators with an indication of the degree of certainty of these recommendations.

VII. EXEMPLARY HARDWARE ARCHITECTURE

Figure 10:
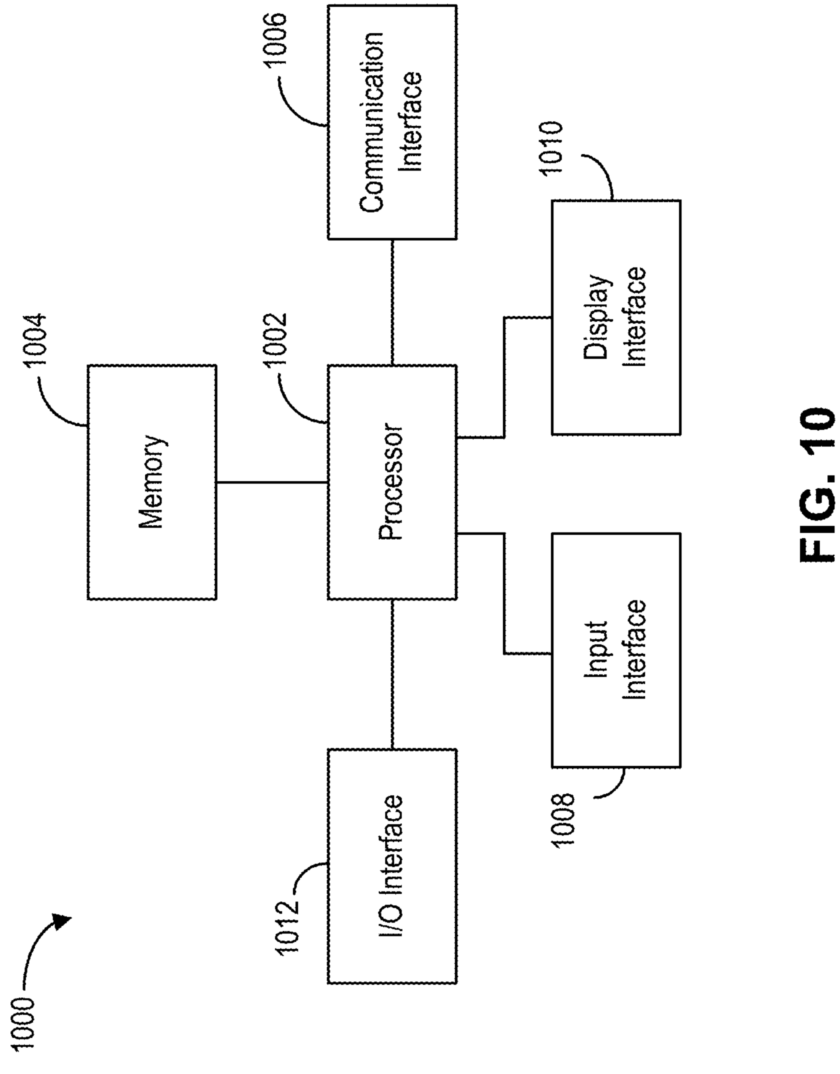
FIG. 10 is a simplified hardware block diagram of an example computing system.

FIG. 10 shows an example simplified hardware block diagram (1000) for a computing system. The hardware block diagram (1000) is illustrative of an exemplary hardware architecture for controller (202) or server (208) (FIG. 2).

As shown, the computing system includes a processor (1002), coupled via a data bus, to a memory (1004) and one or more of a communication interface (1006), input interface (1008), display interface (1010) and input/output (I/O) interface (1012).

Processor (1002) comprises one or more electronic devices that is/are capable of reading and executing instructions stored on a memory to perform operations on data, which may be stored on a memory or provided in a data signal. The term "processor" includes a plurality of physically discrete, operatively connected devices despite use of the term in the singular. Non-limiting examples of processors include devices referred to as microprocessors, microcontrollers, central processing units (CPU), and digital signal processors.

Memory (1004) comprises non-transitory tangible computer-readable medium for storing information in a format readable by a processor, and/or instructions readable by a processor to implement an algorithm. The term "memory" includes a plurality of physically discrete, operatively connected devices despite use of the term in the singular. Non-limiting types of memory include solid-state, optical, and magnetic computer readable media. Memory may be non-volatile or volatile. Instructions stored by a memory may be based on a plurality of programming languages known in the art, with non-limiting examples including the C, C++, Python™, MATLAB™, and Java™ programming languages.

To that end, it will be understood by those of skill in the art that references herein to a computing system (e.g., controller (202) or server (208)) as carrying out a function or acting in a particular way imply that the corresponding processor (1002) is executing instructions (e.g., a software program) stored in memory (1004) and possibly transmitting or receiving inputs and outputs via one or more interfaces.

Communication interface (1006) can be any interface (e.g., cellular modem, antenna, etc.) for communicating over a network, e.g., network (205) in FIG. 2. This includes transmitting and receiving data over the network.

Input interface (1008) is any interface for receiving inputs, e.g., from a wireline operator. This can include a keyboard and/or mouse, or a touchscreen interface (e.g., a capacitive touchscreen interface). In some cases, where the input interface (1008) is a touchscreen interface, the input interface and display interface are one of the same.

Display interface (1010) can be any suitable interface for displaying outputs (e.g., LCD screen or the like), and can display various graphical user interfaces (GUIs).

I/O interface (1012) can couple to various external systems and devices. For example, for controller (202) (FIG. 2), I/O interface (1010) can couple to one or more of the wireline measuring head (206*a*) and wireline control subsystem (204).

VIII. INTERPRETATION

Various systems or methods have been described to provide an example of an embodiment of the claimed subject matter. No embodiment described limits any claimed subject matter and any claimed subject matter may cover methods or systems that differ from those described below. The claimed subject matter is not limited to systems or methods having all of the features of any one system or method described below or to features common to multiple or all of the apparatuses or methods described below. It is possible that a system or method described is not an embodiment that is recited in any claimed subject matter. Any subject matter disclosed in a system or method described that is not claimed in this document may be the subject matter of another protective instrument, for example, a continuing patent application, and the applicants, inventors or owners do not intend to abandon, disclaim or dedicate to the public any such subject matter by its disclosure in this document.

Furthermore, it will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It should also be noted that the terms "coupled" or "coupling" as used herein can have several different meanings depending in the context in which these terms are used. For example, the terms coupled or coupling may be used to indicate that an element or device can electrically, optically, or wirelessly send data to another element or device as well as receive data from another element or device. As used herein, two or more components are said to be "coupled", or "connected" where the parts are joined or operate together either directly or indirectly (i.e., through one or more intermediate components), so long as a link occurs. As used herein and in the claims, two or more parts are said to be "directly coupled", or "directly connected", where the parts are joined or operate together without intervening intermediate components.

It should be noted that terms of degree such as "substantially", "about" and "approximately" as used herein mean a reasonable amount of deviation of the modified term such that the end result is not significantly changed. These terms of degree may also be construed as including a deviation of the modified term if this deviation would not negate the meaning of the term it modifies.

Furthermore, any recitation of numerical ranges by endpoints herein includes all numbers and fractions subsumed within that range (e.g. 1 to 5 includes 1, 1.5, 2, 2.75, 3, 3.90, 4, and 5). It is also to be understood that all numbers and fractions thereof are presumed to be modified by the term "about" which means a variation of up to a certain amount of the number to which reference is being made if the end result is not significantly changed.

The example embodiments of the systems and methods described herein may be implemented as a combination of hardware or software. In some cases, the example embodiments described herein may be implemented, at least in part, by using one or more computer programs, executing on one or more programmable devices comprising at least one processing element, and a data storage element (including volatile memory, non-volatile memory, storage elements, or any combination thereof). These devices may also have at least one input device (e.g. a pushbutton keyboard, mouse, a touchscreen, and the like), and at least one output device (e.g. a display screen, a printer, a wireless radio, and the like) depending on the nature of the device.

It should also be noted that there may be some elements that are used to implement at least part of one of the embodiments described herein that may be implemented via software that is written in a high-level computer programming language such as object oriented programming or script-based programming. Accordingly, the program code may be written in Java, Swift/Objective-C, C, C++, Javascript, Python, SQL or any other suitable programming language and may comprise modules or classes, as is known to those skilled in object oriented programming. Alternatively, or in addition thereto, some of these elements implemented via software may be written in assembly language, machine language or firmware as needed. In either case, the language may be a compiled or interpreted language.

At least some of these software programs may be stored on a storage media (e.g. a computer readable medium such as, but not limited to, ROM, magnetic disk, optical disc) or a device that is readable by a general or special purpose programmable device. The software program code, when read by the programmable device, configures the programmable device to operate in a new, specific and predefined manner in order to perform at least one of the methods described herein.

Furthermore, at least some of the programs associated with the systems and methods of the embodiments described herein may be capable of being distributed in a computer program product comprising a computer readable medium that bears computer usable instructions for one or more processors. The medium may be provided in various forms, including non-transitory forms such as, but not limited to, one or more diskettes, compact disks, tapes, chips, and magnetic and electronic storage. The computer program product may also be distributed in an over-the-air or wireless manner, using a wireless data connection.

The term "software application" or "application" refers to computer-executable instructions, particularly computer-executable instructions stored in a non-transitory medium, such as a non-volatile memory, and executed by a computer processor. The computer processor, when executing the instructions, may receive inputs and transmit outputs to any of a variety of input or output devices to which it is coupled. Software applications may include mobile applications or "apps" for use on mobile devices such as smartphones and tablets or other "smart" devices.

A software application can be, for example, a monolithic software application, built in-house by the organization and possibly running on custom hardware; a set of interconnected modular subsystems running on similar or diverse hardware; a software-as-a-service application operated remotely by a third party; third party software running on outsourced infrastructure, etc. In some cases, a software application also may be less formal, or constructed in ad hoc fashion, such as a programmable spreadsheet document that has been modified to perform computations for the organization's needs.

Software applications may be deployed to and installed on a computing device on which it is to operate. Depending on the nature of the operating system and/or platform of the computing device, an application may be deployed directly to the computing device, and/or the application may be downloaded from an application marketplace. For example, user of the user device may download the application through an app store such as the Apple App Store™ or Google™ Play™.

The present invention has been described here by way of example only, while numerous specific details are set forth herein in order to provide a thorough understanding of the exemplary embodiments described herein. However, it will be understood by those of ordinary skill in the art that these embodiments may, in some cases, be practiced without these specific details. In other instances, well-known methods, procedures and components have not been described in detail so as not to obscure the description of the embodiments. Various modification and variations may be made to these exemplary embodiments without departing from the spirit and scope of the invention, which is limited only by the appended claims.

The invention claimed is:

1. A computer-implemented method for controlling a multi-stage wireline operation in a well, comprising:

applying an initial stage machine learning model to generate predictions for optimized wireline parameters, for a first stage of the multi-stage wireline operation, wherein the optimized wireline parameters comprise one or more of an optimized speed and tension, for deploying a wireline inside the well during the first stage;

monitoring deployment of the wireline during the first stage, to generate measured wireline data comprising one or more of measured wireline tension and speed; and training a later stages machine learning model using the optimized wireline parameters and measured wireline data, from the first stage, wherein the later stages machine learning model is configured to generate predictions for the optimized wireline parameters for a subsequent stage of the wireline operation.

2. The method of claim 1, wherein the method is applied as part of a plug-and-perf operation, and each stage comprises one or both of a run in hole (RIH) and pull out of hole (POOH) process, and the wireline is further coupled to a bottomhole assembly.

3. The method of claim 1, wherein the input into the trained initial stage model comprises structural data relating to the well.

4. The method of claim 1, further comprising, initially, training the initial stage model by:

generating an input feature set comprising: (i) at least one first training feature generated based on structural data for at least one historical well; and (ii) at least one second training feature based on wireline operation data for the at least one historical well; and training the initial stage model based on the input feature set.

5. The method of claim 4, wherein the at least one first training feature comprises one or more of: (i) cosine and sine of azimuth, (ii) distance to and from kickoff, (iii) shifted inclination values, (iv) mean values of inclination and azimuth, and (v) measured depth, of the at least one historical well.

6. The method of claim 1, wherein the optimized wireline parameters and measured wireline data are generated and collected, respectively, at different depth intervals inside the well.

7. The method of claim 1, wherein training the later stages model comprises iteratively training the model by:

monitoring deployment of the wireline during a given stage of the wireline operation to generate corresponding measured wireline data;

generating training features based on one or more of: (i) wireline operation data for the given stage, and (ii) structural data for the well; and training or re-training the later stages model using the one or more training features.

8. The method of claim 1, wherein the method is stored on at least one non-transitory memory, and executable by at least one processor.

9. The method of claim 8, wherein, the wireline is deployed using a wireline control system, which controls one or more of the deployment speed and tension of the wireline, inside the well, according to the predicted optimized wireline parameters for a given stage.

10. The method of claim 9, wherein the wireline control system is operated manually automatically by the at least one processor.

11. The method of claim 1, wherein the monitoring occurs using a sensor system comprising one or more sensors for generating the measured wireline data, during the wireline operation.

12. A system for controlling a multi-stage wireline operation in a well, the system comprising:

a sensor system comprising one or more sensors for generating measured wireline data, comprising one or more of measured wireline tension and speed during the wireline operation and at least one non-transitory memory storing instructions, which when executed by at least one processor, configures the at least one processor to execute a method comprising:

applying an initial stage machine learning model to generate predictions for optimized wireline parameters, for a first stage of the multi stage wireline operation, wherein the optimized wireline parameters comprise one or more of an optimized speed and tension, for deploying a wireline inside the well during the first stage;

monitoring, using the sensor system, deployment of the wireline during the first stage, to generate the measured wireline data; and training a later stages machine learning model using the optimized wireline parameters and measured wireline data from the first stage, wherein the later stages machine learning model is configured to generate predictions for the optimized wireline parameters for each a subsequent stage of the wireline operation.

13. The system of claim 12, wherein the method is applied as part of a plug-and-perf operation, and each stage comprises one or both of a run in hole (RIH) and pull out of hole (POOH) process, and the wireline is further coupled to a bottomhole assembly.

14. The system of claim 12, wherein the input into the trained initial stage model comprises structural data relating to the well.

15. The system of claim 12, wherein the method further comprises, initially training the initial stage model by:

generating an input feature set comprising: (i) at least one first training feature generated based on structural data for at least one historical well; and (ii) at least one second training feature based on wireline operation data for the at least one historical well; and training the initial stage model based on the input feature set.

16. The system of claim 15, wherein the at least one first training feature comprises one or more of: (i) cosine and sine of azimuth, (ii) distance to and from kickoff, (iii) shifted inclination values, (iv) mean values of inclination and azimuth, and (v) measured depth.

17. The system of claim 12, wherein the optimized wireline parameters and measured wireline data are generated and collected, respectively, at different depth intervals inside the well.

18. The system of claim 12, wherein training the later stages model comprises iteratively training the model by:

monitoring deployment of the wireline during a given stage of the wireline operation to generate measured wireline data;

generating training features based on one or more of: (i) the wireline operation data for the given stage, and (ii) structural data for the well; and training or re-training the later stages model using the one or more training features.

19. The system of claim 12, further comprising a wireline control system, and the method further comprising:

controlling, using the wireline control system, one or more of the deployment speed and tension of the wireline according to the predicted optimized wireline parameters for a given stage.

20. The system of claim 19, wherein the wireline control system is operated manually, or automatically by the at least one processor.

* * * * *